(12) United States Patent
Tamura

(10) Patent No.: US 8,391,650 B2
(45) Date of Patent: *Mar. 5, 2013

(54) METHOD AND APPARATUS OF IMAGE PROCESSING TO DETECT EDGES

(75) Inventor: Tadashi Tamura, North Haven, CT (US)

(73) Assignee: Hitachi Aloka Medical, Ltd, Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 13/226,033

(22) Filed: Sep. 6, 2011

(65) Prior Publication Data

US 2011/0317902 A1 Dec. 29, 2011

Related U.S. Application Data

(62) Division of application No. 10/882,863, filed on Jun. 30, 2004, now Pat. No. 8,031,978.

(51) Int. Cl.
*G06K 9/60* (2006.01)

(52) U.S. Cl. ......... 382/303; 382/260; 382/266; 708/300

(58) Field of Classification Search ........... 382/260–265
See application file for complete search history.

(56) References Cited

U.S. PATENT DOCUMENTS

| | | | |
|---|---|---|---|
| 4,292,621 A | 9/1981 | Fuller | |
| 4,524,455 A | 6/1985 | Holsztynski et al. | |
| 4,553,260 A | 11/1985 | Belt et al. | |
| 4,566,125 A | 1/1986 | Clunn | |
| 4,603,430 A * | 7/1986 | Sacks | 382/206 |
| 4,720,871 A * | 1/1988 | Chambers | 382/278 |
| 4,747,157 A | 5/1988 | Kurakake et al. | |
| 4,771,470 A * | 9/1988 | Geiser et al. | 382/266 |
| 4,918,742 A * | 4/1990 | Simonds | 382/304 |
| 4,947,446 A * | 8/1990 | Jutand et al. | 382/279 |
| 5,119,444 A | 6/1992 | Nishihara | |
| 5,373,460 A * | 12/1994 | Marks, II | 708/300 |
| 5,390,262 A | 2/1995 | Pope | |
| 5,410,621 A | 4/1995 | Hyatt | |
| 5,457,548 A * | 10/1995 | Funada | 358/500 |
| 5,457,754 A | 10/1995 | Han et al. | |
| 5,492,125 A | 2/1996 | Kim et al. | |

(Continued)

FOREIGN PATENT DOCUMENTS

| | | |
|---|---|---|
| EP | 1 030 187 A2 | 8/2000 |
| EP | 1 416 443 A1 | 5/2004 |

(Continued)

OTHER PUBLICATIONS

Rafael C. Gonzalez and Richard E. Woods, "Digital Image Processing", 2002, 2nd Edition, Prentice Hall, (cover p. 2 + pp. 1-2, 28-30, 116-119, 576-580, 16 pages total).

(Continued)

*Primary Examiner* — Matthew Bella
*Assistant Examiner* — Gandhi Thirugnanam
(74) *Attorney, Agent, or Firm* — Buckley, Maschoff & Talwalkar LLC

(57) ABSTRACT

An edge detection filter comprising an array of filter coefficients having an odd number of rows and columns, a first set of zero coefficients extending along a direction traversing the array through a center position to form a first and second side, a second set of positive coefficients extending away from the direction on the first side, and a third set of negative coefficients extending away from the direction on the second side.

5 Claims, 23 Drawing Sheets

U.S. PATENT DOCUMENTS

| | | | | |
|---|---|---|---|---|
| 5,668,895 | A * | 9/1997 | Yamazaki et al. | 382/260 |
| 6,047,091 | A * | 4/2000 | Anderson | 382/260 |
| 6,064,768 | A | 5/2000 | Hajj et al. | |
| 6,078,281 | A * | 6/2000 | Milkovich et al. | 342/196 |
| 6,215,898 | B1 | 4/2001 | Woodfill et al. | |
| 6,249,608 | B1 | 6/2001 | Ikeda et al. | |
| 6,389,441 | B1 * | 5/2002 | Archer et al. | 708/445 |
| 6,558,326 | B2 | 5/2003 | Pelissier | |
| 6,640,015 | B1 * | 10/2003 | Lafruit et al. | 382/260 |
| 6,667,815 | B1 * | 12/2003 | Nagao | 358/1.9 |
| 6,674,879 | B1 | 1/2004 | Weisman et al. | |
| 6,701,341 | B1 | 3/2004 | Wu et al. | |
| 6,714,694 | B1 * | 3/2004 | Marshall | 382/307 |
| 6,733,454 | B1 | 5/2004 | Bakircioglu et al. | |
| 6,900,811 | B2 * | 5/2005 | Sandford | 345/539 |
| 6,911,008 | B2 | 6/2005 | Pelissier et al. | |
| 6,987,886 | B1 * | 1/2006 | Okubo et al. | 382/194 |
| 6,993,207 | B1 | 1/2006 | Slavin | |
| 7,664,326 | B2 * | 2/2010 | Tamura | 382/199 |
| 8,031,978 | B2 * | 10/2011 | Tamura | 382/303 |
| 2002/0015528 | A1 * | 2/2002 | Kondo et al. | 382/224 |
| 2002/0135586 | A1 * | 9/2002 | Sandford | 345/543 |
| 2002/0141654 | A1 * | 10/2002 | Rosales | 382/261 |
| 2003/0095714 | A1 * | 5/2003 | Avinash | 382/260 |
| 2003/0095715 | A1 * | 5/2003 | Avinash | 382/260 |
| 2003/0118245 | A1 | 6/2003 | Yaroslavsky et al. | |
| 2003/0223615 | A1 * | 12/2003 | Keaton et al. | 382/100 |
| 2004/0146201 | A1 | 7/2004 | Sathyanarayana | |
| 2004/0182991 | A1 | 9/2004 | Sugita | |
| 2006/0002624 | A1 * | 1/2006 | Tamura | 382/266 |
| 2006/0020203 | A1 * | 1/2006 | Tamura | 600/437 |

FOREIGN PATENT DOCUMENTS

| | | |
|---|---|---|
| JP | 2003060896 A | 2/2003 |

OTHER PUBLICATIONS

Steve Hodges and Bob Richards, "Technical Report Faster spatial image processing using partial summation", Jan. 1996, Cambridge University Engineering Department, United Kingdom, 44pgs.

"Supplemental Partial European Search Report", dated Aug. 19, 2009 for European Patent No. 05850733.6-1265 / 1761172, 9pgs.

* cited by examiner

| −1 | −1 | −1 | —11 |
|---|---|---|---|
| 0 | 0 | 0 | |
| 1 | 1 | 1 | |

| −1 | 0 | 1 |
|---|---|---|
| −1 | 0 | 1 |
| −1 | 0 | 1 | —13 |

FIG. 1a
(PRIOR ART)

| −1 | −2 | −1 | —15 |
|---|---|---|---|
| 0 | 0 | 0 | |
| 1 | 2 | 1 | |

| −1 | 0 | 1 |
|---|---|---|
| −2 | 0 | 2 |
| −1 | 0 | 1 | —17 |

FIG. 1b
(PRIOR ART)

| 1 | 0 | —19 |
|---|---|---|
| 0 | −1 | |

| 0 | 1 |
|---|---|
| −1 | 0 | —21 |

FIG. 1c
(PRIOR ART)

|   |   |   |
|---|---|---|
| 1 | 1 | 1 |
| 1 | 1 | 1 |
| 1 | 1 | 1 |

|   |   |   |   |   |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |

|   |   |   |   |   |   |   |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

| -1 |
|----|
| 0  |
| 1  |

FIG. 3a
(PRIOR ART)
─31

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

| -1 | -1 | -1 | -1 | -1 |
|----|----|----|----|----|
| -1 | -1 | -1 | -1 | -1 |
| -1 | -1 | -1 | -1 | -1 |
| -1 | -1 | -1 | -1 | -1 |
| -1 | -1 | -1 | -1 | -1 |
| 0  | 0  | 0  | 0  | 0  |
| 0  | 0  | 0  | 0  | 0  |

| 0 | 0 | 0 | 0 | 0 |
|---|---|---|---|---|
| 0 | 0 | 0 | 0 | 0 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |

| -1 | -1 | -1 | -1 | -1 | ⎯ 39 |
|----|----|----|----|----|------|
| -1 | -1 | -1 | -1 | -1 | |
| 0  | 0  | 0  | 0  | 0  | |
| 0  | 0  | 0  | 0  | 0  | |
| 0  | 0  | 0  | 0  | 0  | |
| 1  | 1  | 1  | 1  | 1  | |
| 1  | 1  | 1  | 1  | 1  | |

*FIG. 3e*

| -1 | -1 | -1 | -1 | -1 | ⎯ 41 |
|----|----|----|----|----|------|
| -1 | -1 | -1 | -1 | -1 | |
| -1 | -1 | -1 | -1 | -1 | |
| 0  | 0  | 0  | 0  | 0  | |
| 1  | 1  | 1  | 1  | 1  | |
| 1  | 1  | 1  | 1  | 1  | |
| 1  | 1  | 1  | 1  | 1  | |
| 1  | 1  | 1  | 1  | 1  | |

| 0 | -1 | -1 | -1 | -1 | -1 | -1 | -1 | -1 |
|---|----|----|----|----|----|----|----|----|
| 1 | 0  | -1 | -1 | -1 | -1 | -1 | -1 | -1 |
| 1 | 1  | 0  | -1 | -1 | -1 | -1 | -1 | -1 |
| 1 | 1  | 1  | 0  | -1 | -1 | -1 | -1 | -1 |
| 1 | 1  | 1  | 1  | 0  | -1 | -1 | -1 | -1 |
| 1 | 1  | 1  | 1  | 1  | 0  | -1 | -1 | -1 |
| 1 | 1  | 1  | 1  | 1  | 1  | 0  | -1 | -1 |
| 1 | 1  | 1  | 1  | 1  | 1  | 1  | 0  | -1 |
| 1 | 1  | 1  | 1  | 1  | 1  | 1  | 1  | 0  |

FIG. 5b

| -1 | -1 | -1 | -1 | -1 | -1 | -1 | -1 | 0 |
|----|----|----|----|----|----|----|----|---|
| -1 | -1 | -1 | -1 | -1 | -1 | -1 | 0  | 1 |
| -1 | -1 | -1 | -1 | -1 | -1 | 0  | 1  | 1 |
| -1 | -1 | -1 | -1 | -1 | 0  | 1  | 1  | 1 |
| -1 | -1 | -1 | -1 | 0  | 1  | 1  | 1  | 1 |
| -1 | -1 | -1 | 0  | 1  | 1  | 1  | 1  | 1 |
| -1 | -1 | 0  | 1  | 1  | 1  | 1  | 1  | 1 |
| -1 | 0  | 1  | 1  | 1  | 1  | 1  | 1  | 1 |
| 0  | 1  | 1  | 1  | 1  | 1  | 1  | 1  | 1 |

| -1 | -1 | -1 | -1 | -1 | -1 | 0 | 1 | 1 |
|----|----|----|----|----|----|----|----|----|
| -1 | -1 | -1 | -1 | -1 | -1 | 0 | 1 | 1 |
| -1 | -1 | -1 | -1 | -1 | 0 | 1 | 1 | 1 |
| -1 | -1 | -1 | -1 | -1 | 0 | 1 | 1 | 1 |
| -1 | -1 | -1 | -1 | 0 | 1 | 1 | 1 | 1 |
| -1 | -1 | -1 | 0 | 1 | 1 | 1 | 1 | 1 |
| -1 | -1 | -1 | 0 | 1 | 1 | 1 | 1 | 1 |
| -1 | -1 | 0 | 1 | 1 | 1 | 1 | 1 | 1 |
| -1 | -1 | 0 | 1 | 1 | 1 | 1 | 1 | 1 |

FIG. 5c

| -1 | -1 | -1 | -1 | -1 | -1 | -1 | -1 | -1 |
|----|----|----|----|----|----|----|----|----|
| -1 | -1 | -1 | -1 | -1 | -1 | -1 | -1 | -1 |
| -1 | -1 | -1 | -1 | -1 | -1 | -1 | 0 | 0 |
| -1 | -1 | -1 | -1 | -1 | 0 | 0 | 1 | 1 |
| -1 | -1 | -1 | -1 | 0 | 1 | 1 | 1 | 1 |
| -1 | -1 | 0 | 0 | 1 | 1 | 1 | 1 | 1 |
| 0 | 0 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |

FIG. 5d

| 1 | 1 | 0 | -1 | -1 | -1 | -1 | -1 | -1 |
|---|---|---|---|---|---|---|---|---|
| 1 | 1 | 0 | -1 | -1 | -1 | -1 | -1 | -1 |
| 1 | 1 | 1 | 0 | -1 | -1 | -1 | -1 | -1 |
| 1 | 1 | 1 | 0 | -1 | -1 | -1 | -1 | -1 |
| 1 | 1 | 1 | 1 | 0 | -1 | -1 | -1 | -1 |
| 1 | 1 | 1 | 1 | 1 | 0 | -1 | -1 | -1 |
| 1 | 1 | 1 | 1 | 1 | 0 | -1 | -1 | -1 |
| 1 | 1 | 1 | 1 | 1 | 1 | 0 | -1 | -1 |
| 1 | 1 | 1 | 1 | 1 | 1 | 0 | -1 | -1 |

| -1 | -1 | -1 | -1 | -1 | -1 | -1 | -1 | -1 |
|---|---|---|---|---|---|---|---|---|
| -1 | -1 | -1 | -1 | -1 | -1 | -1 | -1 | -1 |
| 0 | 0 | -1 | -1 | -1 | -1 | -1 | -1 | -1 |
| 1 | 1 | 0 | 0 | -1 | -1 | -1 | -1 | -1 |
| 1 | 1 | 1 | 1 | 0 | -1 | -1 | -1 | -1 |
| 1 | 1 | 1 | 1 | 1 | 0 | 0 | -1 | -1 |
| 1 | 1 | 1 | 1 | 1 | 1 | 1 | 0 | 0 |
| 1 | 1 | 1 | 1 | 1 | 1 | 1 | 1 | 1 |
| 1 | 1 | 1 | 1 | 1 | 1 | 1 | 1 | 1 |

| -1 | -1 | -1 | -1 | -1 | -1 | -1 | -1 | -1 |
|---|---|---|---|---|---|---|---|---|
| -1 | -1 | -1 | -1 | -1 | -1 | -1 | -1 | -1 |
| -1 | -1 | -1 | -1 | -1 | -1 | -1 | -1 | -1 |
| -1 | -1 | -1 | -1 | -1 | -1 | -1 | -1 | -1 |
| 0 | 0 | 0 | 0 | 0 | 0 | 0 | 0 | 0 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |

| -1 | -1 | -1 | -1 | 0 | 1 | 1 | 1 | 1 |
|---|---|---|---|---|---|---|---|---|
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |

FIG. 5h

| -a | -a | -a | -a | -a | -a | -a | -a | -a |
|---|---|---|---|---|---|---|---|---|
| -a | -a | -a | -a | -a | -a | -a | -a | -a |
| -a | -a | -a | -a | -a | -a | -a | -a | -a |
| -a | -a | -a | -a | -a | -a | -a | -a | -a |
| 0 | 0 | 0 | 0 | 0 | 0 | 0 | 0 | 0 |
| a | a | a | a | a | a | a | a | a |
| a | a | a | a | a | a | a | a | a |
| a | a | a | a | a | a | a | a | a |
| a | a | a | a | a | a | a | a | a |

| -a | -a | -a | -a | 0 | a | a | a | a |
|---|---|---|---|---|---|---|---|---|
| -a | -a | -a | -a | 0 | a | a | a | a |
| -a | -a | -a | -a | 0 | a | a | a | a |
| -a | -a | -a | -a | 0 | a | a | a | a |
| -a | -a | -a | -a | 0 | a | a | a | a |
| -a | -a | -a | -a | 0 | a | a | a | a |
| -a | -a | -a | -a | 0 | a | a | a | a |
| -a | -a | -a | -a | 0 | a | a | a | a |
| -a | -a | -a | -a | 0 | a | a | a | a |

| | | | | | | | | |
|---|---|---|---|---|---|---|---|---|
| −a11 | −a12 | −a13 | −a14 | −a15 | −a16 | −a17 | −a18 | −a19 |
| −a21 | −a22 | −a23 | −a24 | −a25 | −a26 | −a27 | −a28 | −a29 |
| −a31 | −a32 | −a33 | −a34 | −a35 | −a36 | −a37 | −a38 | −a39 |
| −a41 | −a42 | −a43 | −a44 | −a45 | −a46 | −a47 | −a48 | −a49 |
| 0 | 0 | 0 | 0 | 0 | 0 | 0 | 0 | 0 |
| a41 | a42 | a43 | a44 | a45 | a46 | a47 | a48 | a49 |
| a31 | a32 | a33 | a34 | a35 | a36 | a37 | a38 | a39 |
| a21 | a22 | a23 | a24 | a25 | a26 | a27 | a28 | a29 |
| a11 | a12 | a13 | a14 | a15 | a16 | a17 | a18 | a19 |

FIG. 7a

| | | | | | | | | |
|---|---|---|---|---|---|---|---|---|
| −a11 | −a21 | −a31 | −a41 | 0 | a41 | a31 | a21 | a11 |
| −a12 | −a22 | −a32 | −a42 | 0 | a42 | a32 | a22 | a12 |
| −a13 | −a23 | −a33 | −a43 | 0 | a43 | a33 | a23 | a13 |
| −a14 | −a24 | −a34 | −a44 | 0 | a44 | a34 | a24 | a14 |
| −a15 | −a25 | −a35 | −a45 | 0 | a45 | a35 | a25 | a15 |
| −a16 | −a26 | −a36 | −a46 | 0 | a46 | a36 | a26 | a16 |
| −a17 | −a27 | −a37 | −a47 | 0 | a47 | a37 | a27 | a17 |
| −a18 | −a28 | −a38 | −a48 | 0 | a48 | a38 | a28 | a18 |
| −a19 | −a29 | −a39 | −a49 | 0 | a49 | a39 | a29 | a19 |

| −b1b1 | −b2b1 | −b3b1 | −b4b1 | −b5b1 | −b4b1 | −b3b1 | −b2b1 | −b1b1 |
|---|---|---|---|---|---|---|---|---|
| −b1b2 | −b2b2 | −b3b2 | −b4b2 | −b5b2 | −b4b2 | −b3b2 | −b2b2 | −b1b2 |
| −b1b3 | −b2b3 | −b3b3 | −b4b3 | −b5b3 | −b4b3 | −b3b3 | −b2b3 | −b1b3 |
| −b1b4 | −b2b4 | −b3b4 | −b4b4 | −b5b4 | −b4b4 | −b3b4 | −b2b4 | −b1b4 |
| 0 | 0 | 0 | 0 | 0 | 0 | 0 | 0 | 0 |
| b1b4 | b2b4 | b3b4 | b4b4 | b5b4 | b4b4 | b3b4 | b2b4 | b1b4 |
| b1b3 | b2b3 | b3b3 | b4b3 | b5b3 | b4b3 | b3b3 | b2b3 | b1b3 |
| b1b2 | b2b2 | b3b2 | b4b2 | b5b2 | b4b2 | b3b2 | b2b2 | b1b2 |
| b1b1 | b2b1 | b3b1 | b4b1 | b5b1 | b4b1 | b3b1 | b2b1 | b1b1 |

| −b1b1 | −b1b2 | −b1b3 | −b1b4 | 0 | b1b4 | b1b3 | b1b2 | b1b1 |
|---|---|---|---|---|---|---|---|---|
| −b2b1 | −b2b2 | −b2b3 | −b2b4 | 0 | b2b4 | b2b3 | b2b2 | b2b1 |
| −b3b1 | −b3b2 | −b3b3 | −b3b4 | 0 | b3b4 | b3b3 | b3b2 | b3b1 |
| −b4b1 | −b4b2 | −b4b3 | −b4b4 | 0 | b4b4 | b4b3 | b4b2 | b4b1 |
| −b5b1 | −b5b2 | −b5b3 | −b5b4 | 0 | b5b4 | b5b3 | b5b2 | b5b1 |
| −b4b1 | −b4b2 | −b4b3 | −b4b4 | 0 | b4b4 | b4b3 | b4b2 | b4b1 |
| −b3b1 | −b3b2 | −b3b3 | −b3b4 | 0 | b3b4 | b3b3 | b3b2 | b3b1 |
| −b2b1 | −b2b2 | −b2b3 | −b2b4 | 0 | b2b4 | b2b3 | b2b2 | b2b1 |
| −b1b1 | −b1b2 | −b1b3 | −b1b4 | 0 | b1b4 | b1b3 | b1b2 | b1b1 |

FIG. 8b

METHOD AND APPARATUS OF IMAGE PROCESSING TO DETECT EDGES

CROSS-REFERENCE TO RELATED APPLICATIONS

The present application is a divisional application of U.S. patent application Ser. No. 10/882,863, entitled "METHOD AND APPARATUS OF IMAGE PROCESSING TO DETECT EDGES" and filed on Jun. 30, 2004. The entire contents of that application are incorporated herein by reference for all purposes.

BACKGROUND OF THE INVENTION

1. Field of Invention

The present invention relates to a method and apparatus of image processing to detect and enhance edges and to reduce noise in medical imaging, e.g. ultrasound imaging, X-ray, MRI, CT. Specifically, the method and apparatus of the present invention relates to the detection of edges in noisy images and enhancement of such edges.

2. Description of Related Art

An object, such as an organ, in an image has borders or edges and image processing can detect these borders or edges. Detection of edges is usually performed with filters 11 as shown in FIGS. 1a-1c. However, it is difficult to detect edges in an image with noise (or poor signal to noise ratio). Edges of noise patterns can be erroneously detected as "edges" rather than the true edges of an object or organ for example. Therefore, a low-pass filter is usually applied to the image before the edge detection in order to reduce noise and to detect the true edges reliably. A low-pass filter can be 3×3, 5×5 or 7×7 or more in size. Such filters are known in the art and examples are illustrated in FIGS. 2a-2c. After the low-pass filter is applied, edge detection is performed using, for example, the filter shown in FIG. 1a. The low-pass filter smoothes the image and reduces noise. However, low-pass filter masks override each other when the filter in FIG. 1a is used, resulting in somewhat fuzzy edges as well as spatial errors with respect to the true edges of the original image. What is therefore needed is a method to detect true edges in images containing noise which does not result in the production of fuzzy edges or spatial errors.

BRIEF DESCRIPTION OF THE DRAWINGS

FIGS. 1(a-c) Prior art edge detection filters
FIGS. 2(a-c) Prior art smoothing filters
FIG. 3a A 1×3 edge detection filter common in the art
FIG. 3b A 5×5 low pass filter known in the art
FIG. 3c The result of combining the −1 edge filter coefficient with the 5×5 low-pass filter
FIG. 3d The result of combining the 1 edge filter coefficient with the 5×5 low-pass filter
FIG. 3e The resulting combination of the results of FIGS. 3c and 3d
FIG. 4 The improved edge detection filter of the present invention
FIGS. 5(a-h) Edge detection filters of various directions of the present invention
FIGS. 6(a-b) Edge detection filters of horizontal and vertical directions showing the more general form wherein a coefficient "a" is employed
FIGS. 7(a-b) Edge detection filters of horizontal and vertical directions using more general form using aij
FIGS. 8(a-b) Edge detection filters of horizontal and vertical directions using more general form using more general form using bibj
FIG. 9a Flow chart of vertical edge detection using (−1, 0, 1)
FIG. 9b Flow chart of horizontal edge detection using (−1, 0, 1)
FIG. 10a Flow chart of horizontal edge detection using −a, 0, a
FIG. 10b Flow chart of vertical edge detection using −a, 0, a
FIG. 11 Diagram of the relationship between old and new filter positions
FIG. 12 Illustration of the movement of the filter of the present invention
FIG. 13 Block diagram of the vertical edge filter hardware of the present invention
FIG. 14 Diagram of an efficient vertical edge detection filter
FIG. 15 Diagram of the horizontal edge filter hardware of the present invention
FIG. 16 Diagram of an efficient horizontal edge detection filter
FIG. 17 Diagram of the horizontal edge detection filter with filter coefficients bi
FIG. 18 Diagram of the vertical edge detection filter with filter coefficients bi

DETAILED DESCRIPTION OF THE PREFERRED EMBODIMENT(S)

Figure 9A:
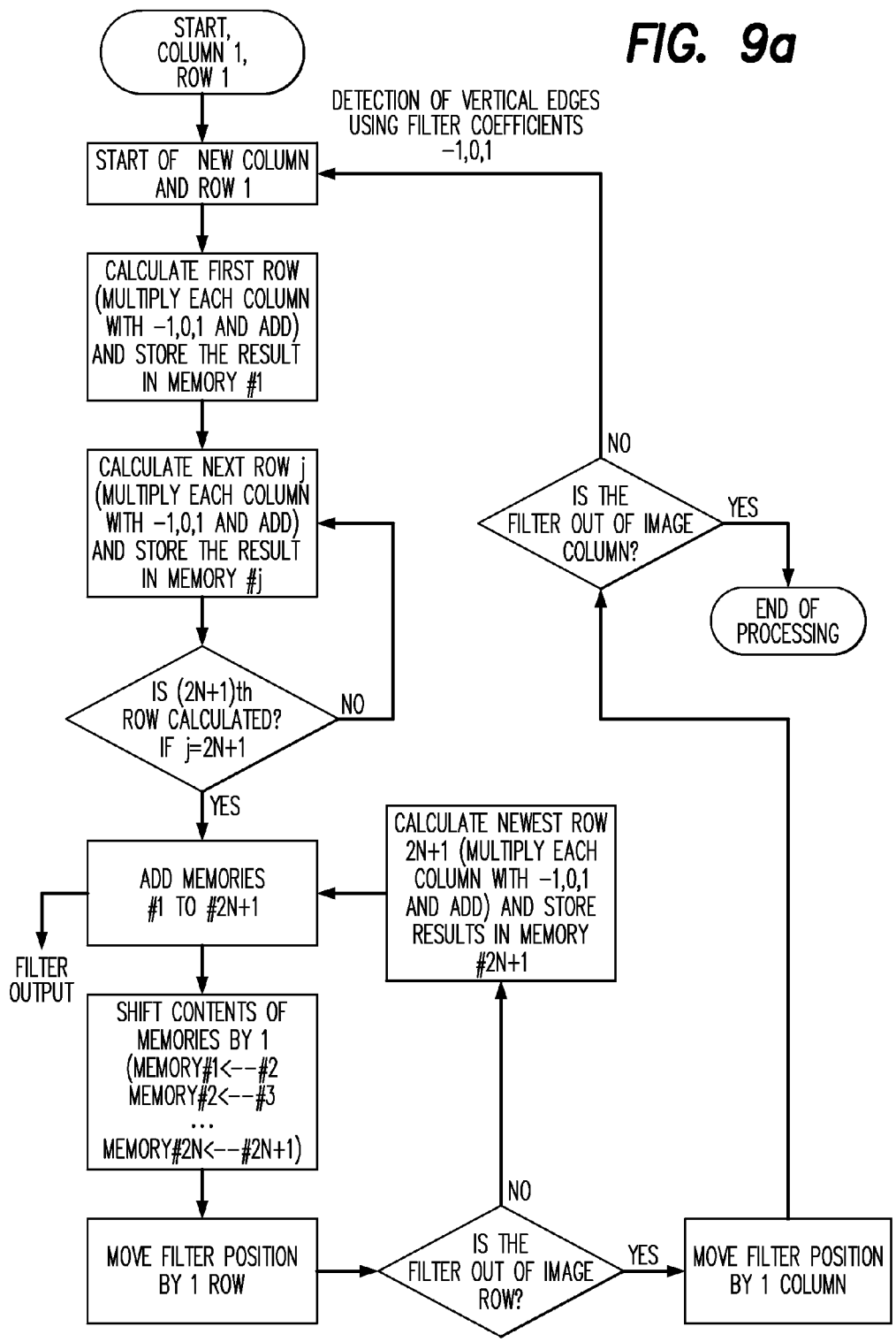

Edges of an object or organ have directions. Therefore, edge detection needs to be performed in directions. With reference to FIG. 5a-5h, there is illustrated edge detection filters in 8 directions (−45°, 45°, 67.5°, 22.5°, −67.5°, −22.5°, 0°, 90°, respectively) of the present invention. Each filter is implemented so as to produce the effect of low-pass filtering as the size of each filter is large and is capable of detecting edges reliably with a better signal to noise ratio than that of the prior art. Yet, unlike the edge detection filter after low-pass filtering of the prior art, the present invention applies the operation of differentiation to image pixels which are not overriding each other. To illustrate this problem of the pre-processing of a low-pass filter, a 1×3 edge detection filter 31 of the horizontal direction, which is a part (or column) of the filter 11 in FIG. 1a, is shown in FIG. 3a. Using three columns of the filter 11 yields an effect of averaging and a higher signal to noise ratio of detecting edges. However, for simplicity, the edge detection filter 31 in FIG. 3a is used to illustrate the overriding problem. FIG. 3b shows a 5×5 low-pass filter 33 which is applied to an image before the edge detection filter 31. FIG. 3c shows the combination of the edge filter 31's coefficient −1 and the low-pass filter 33 while FIG. 3d shows the combination of the edge filter 31's coefficient 1 and the low-pass filter 33. The filter 31's coefficient 0 has no effects or no output. FIG. 3e shows the overall effect of the edge filter 31 and the low-pass filter 33 on the original image. The center three rows are overridden and the filter coefficients cancel each other and become 0. The center three rows of zero act like an edge detection filter of a spatial resolution of approximately 3 times worse than the original filter of a 1×3 filter having only one row of zeros. Therefore, the detected edge will be fuzzy. To maintain the spatial resolution (sharpness) and registration (position) of the edge, the row of coefficients 0 should be as narrow as possible. Three rows of zeros are two rows too many for coefficients of 0. An improved edge detection filter is shown for the same size array (7×5) in FIG. 4.

This improved filter 15 is more accurate in detecting the position of the edge than is that of FIG. 3e and yet has better signal-to-noise ratio (SNR) in detecting the edge as it has a feature of low-pass filtering in the upper and lower areas surrounding the row of 0. Usually, an edge detection filter is applied to an image with the result of the filter operation assigned to a pixel representing the center of the edge detection filter. Typically, when the edge detection filter is centered on an edge, the value of the center pixel is of a large relative magnitude.

Referring to FIGS. 5a-5h, eight edge detection filters of the present invention are shown to illustrate the main concept of the filter of the present invention. The number of filters or directions can be extended to twenty or more with eight exemplary filters shown in FIG. 5. Twenty filters can be designed with a step of approximately nine degrees in direction. As shown in FIG. 5, the filters 51 have coefficients at the intersection of each row and column of an integer value, usually 1, −1 or 0, to provide for quick calculation. Coefficients of 1, −1 or 0 do not require multiplication but, rather, can be applied to an image using only addition and subtraction. However, filter coefficients are not necessarily restricted to integers but can be extended to decimal values (or floating-point numbers). Filter coefficients of all these filters 51 are symmetrical except the sign (i.e., plus or minus) either vertically, horizontally or in the direction of the edge that the filter is designed to detect. The center positions are all 0. For example, filter coefficients of the center row are all 0 for a horizontal edge detecting filter as illustrated in FIG. 5g. Filter coefficients of the center column are all 0 for a vertical edge detecting filter as shown in FIG. 5h. Note that, with the exception of directions of 0°, 90°, 45°, and −45°, the zero coefficients of the edge detection filter 31 are located in the row and column positions aligned with detection direction 57.

Edge detection filters with many directions are ideal for detecting edges with great accuracy and sensitivity for the directions but somewhat limited for real-time implementation. Each filter requires many calculations for a given image and the number of overall calculations increase with the number of filters. Therefore, an alternative embodiment of the present invention uses only 2 filters of the vertical and horizontal directions. Edges of other directions are detected using a filter size (2M+1)×(2N+1) as follows $$R_X = -\sum_{\substack{i=1 \\ j=1}}^{\substack{i=2M+1 \\ j=N}} z_{i,j} + \sum_{\substack{i=1 \\ j=N+2}}^{\substack{i=2M+1 \\ j=2N+1}} z_{i,j} \tag{1}$$

$$R_Y = \sum_{j=1}^{j=2N+1}\left(-\sum_{i=1}^{i=M} z_{i,j} + \sum_{i=M+2}^{i=2M+1} z_{i,j}\right) \tag{2}$$

M and N are integers and can be equal to each other. $Z_{i,j}$ is the image value to which the filter is applied at a point (i,j). $R_x$ and $R_y$ are the filter outputs.

The direction of the edge is determined by $$\vartheta = \tan^{-1}\frac{R_Y}{R_X} \tag{3}$$

The magnitude or strength of the edge is determined by $$\mathrm{mag} = (R_x^2 + R_y^2)^{0.5} \approx |R_x| + |R_y| \tag{4}$$

The magnitude of the combined horizontal ($R_x$) and vertical ($R_y$) edge detection results is indicative of the presence of an edge.

The use of these 2 edge filters alone speed up the processing by a factor of 10 compared with the use of 20 filters. Furthermore, the use of these 2 edge detection filters makes it possible to further speedup the processing by reducing the number of identical calculations performed at different filter positions. For a filter mask size of about 11×11, this increase in speed can be as much as 10 times as described in the following sections. Therefore, combined with the decrease in the number of filters, the overall increase in the speed can be as much as 100 times. This makes real-time implementation of image processing possible.

One method employed by the present invention to speed up the calculations required to apply one or more edge filters of the present invention involves iteration. A general form of the edge filter can be expressed by $$R = \sum_{\substack{i=1 \\ j=1}}^{\substack{i=2M+1 \\ j=2N+1}} w_{ij} z_{ij} \tag{5}$$

where, i: x-coordinate, j: y-coordinate in the filter mask, and M, N are integers, R is the filter output and, $w_{ij}$ are the filter coefficients at (i,j) while are image values at (i,j).

For the horizontal edge filter (0 degrees or x-direction) shown in FIG. 5g, the filter can be expressed as follows, $$R_X = -\sum_{\substack{i=1, \\ j=1}}^{\substack{i=2M+1 \\ j=N}} z_{i,j} + \sum_{\substack{i=1 \\ j=N+2}}^{\substack{i=2M+1 \\ j=2N+1}} z_{i,j} \tag{6}$$

And this can be further expressed for each row as follows, $$R_{X,1} = \sum_{i=1}^{i=2M+1} z_{i,1} \tag{7}$$

$$R_{X,2} = \sum_{i=1}^{i=2M+1} z_{i,2} \tag{8}$$

$$R_{X,2N+1} = \sum_{i=1}^{i=2M+1} z_{i,2N+1} \tag{9}$$

Then the result of each row calculation is summed as follows, $$R_X = -\sum_{j=1}^{j=N} R_{X,j} + \sum_{j=N+2}^{j=2N+1} R_{X,j} \tag{10}$$

where the center row (j=N+1) coefficient is 0.

Figure 11:
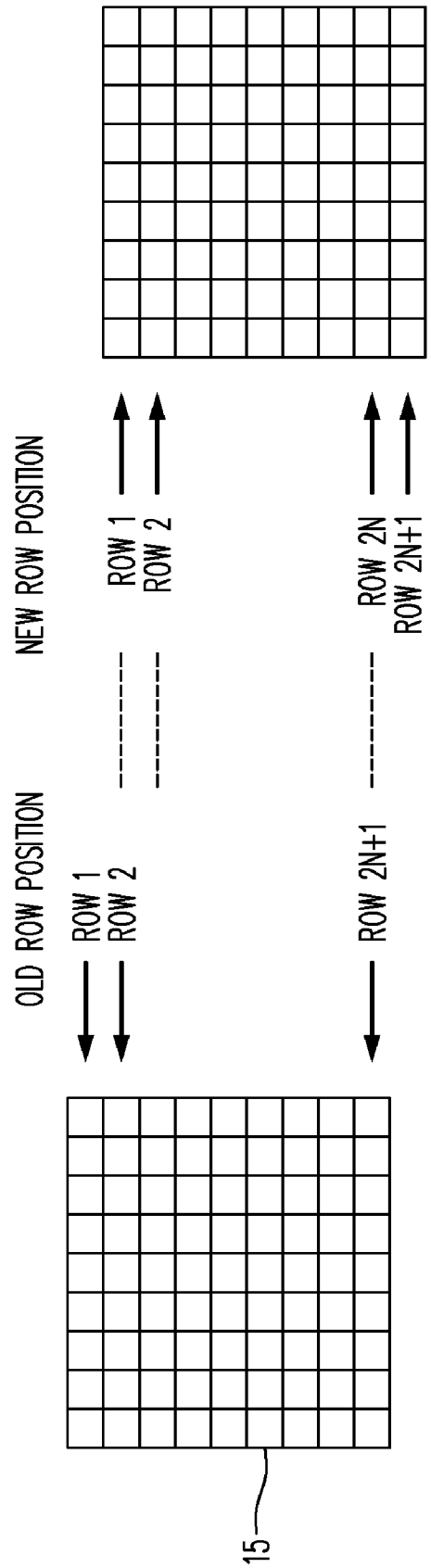
Figure 12:
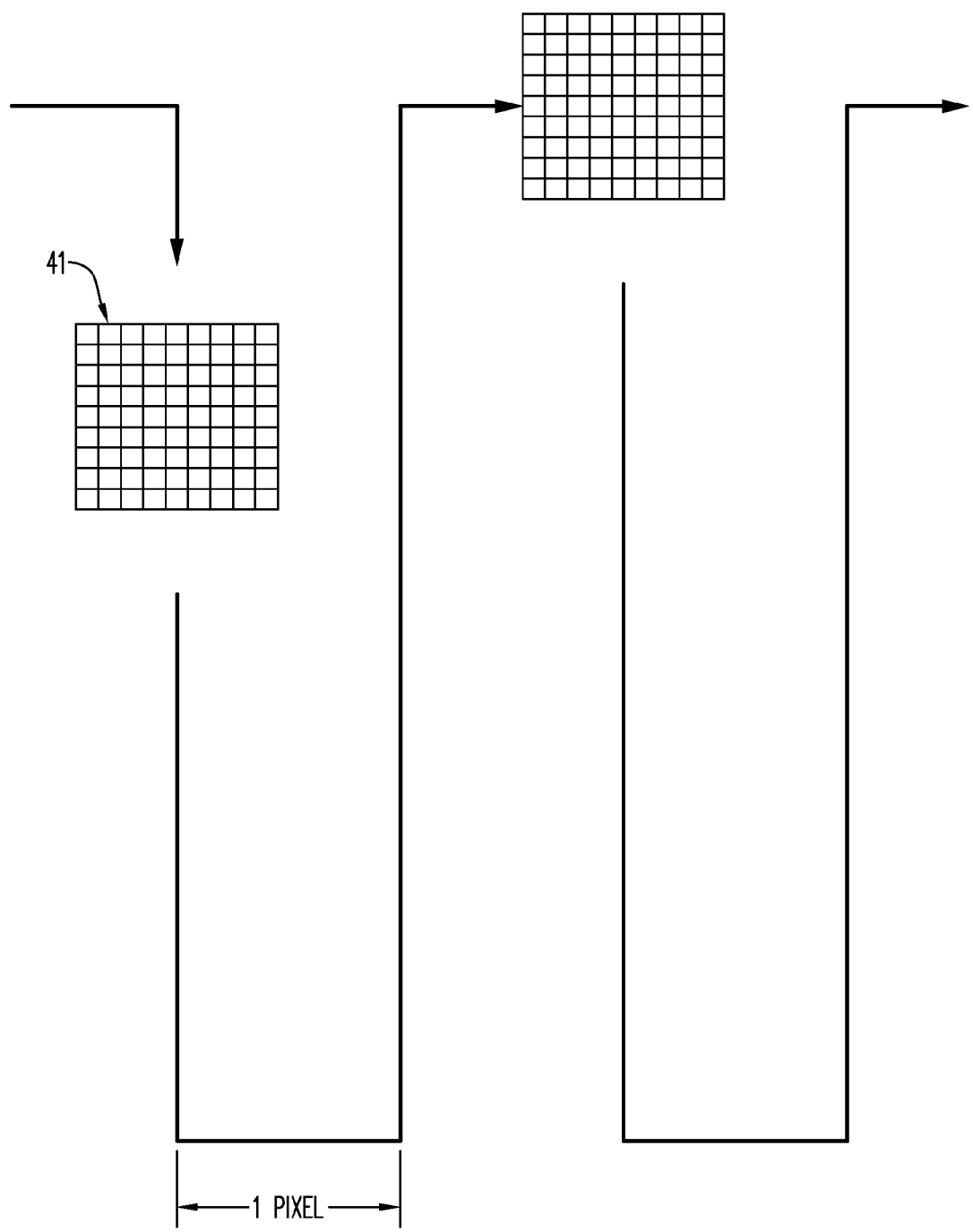

In order to speed up the filter calculation for the whole image area 10 of many filter positions 13, 13' as illustrated in FIG. 12. Once the filter 15 at the first position was calculated, the filter at the next position (as the filter moves one row down) is efficiently calculated by shifting the content of memories by one and calculating only the newest row. This is schematically illustrated in FIG. 11. The memory contents are shifted as follows, $$R_{X,1} \leftarrow R_{X,2} \qquad (11)$$

$$R_{X,2} \leftarrow R_{X,3} \qquad (12)$$

$$\ldots$$
$$\ldots$$

$$R_{X,2N} \leftarrow R_{X,2N+1} \qquad (13)$$

Finally, the newest row is calculated as follows, $$R_{X,2N+1} = \sum_{i=1}^{i=2M+1} z_{i,2N+1} \qquad (14)$$

Then these terms or the contents of the memories are summed as follows, $$R_X = -\sum_{j=1}^{j=N} R_{X,j} + \sum_{j=N+2}^{j=2N+1} R_{X,j} \qquad (15)$$

Figure 9B:
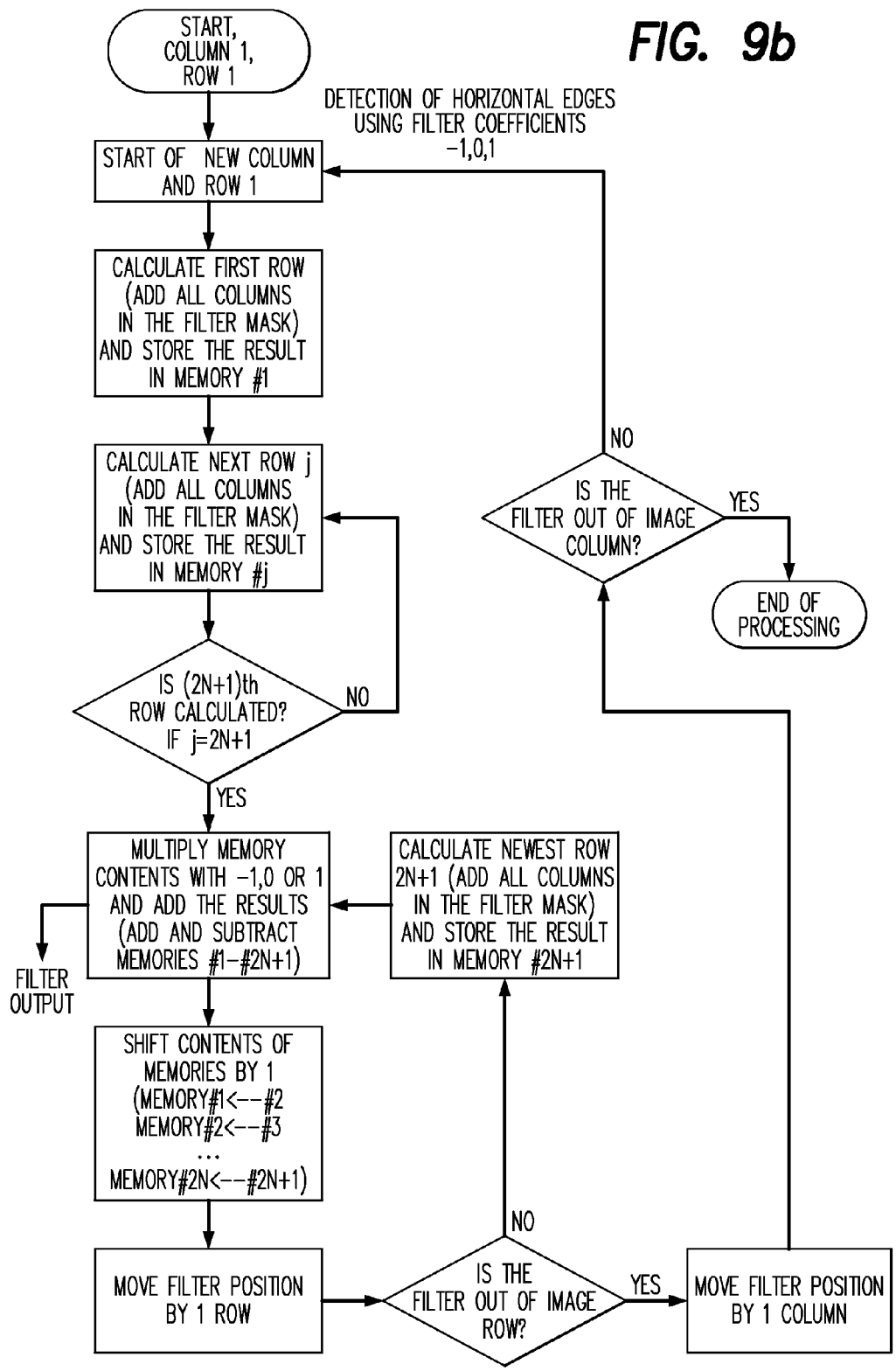
Figure 15:
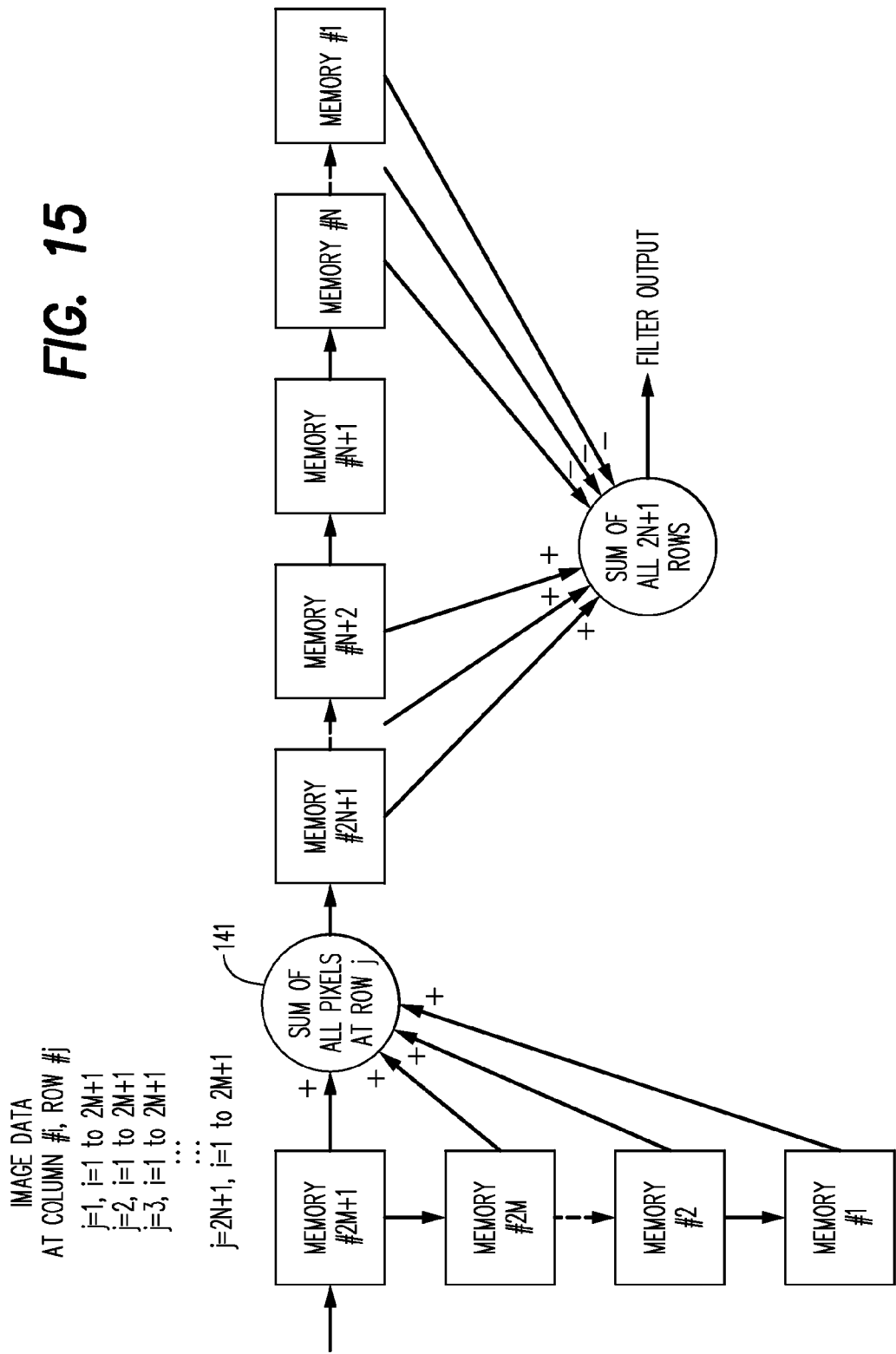

This efficient filter calculation is illustrated in the flow chart shown in FIG. 9b. The calculation is illustrated using a horizontal edge detection filter such as one illustrated in FIG. 5g. As is illustrated, the method of performing edge detection using the horizontal edge filter consisting of coefficients −1, 0 and 1 begins at the starting column 1, row 1 of an image. First, there is calculated the first row by adding all of the columns in the image corresponding to the columns in the edge detection filter and storing the results in memory #1. Then, the next row j is calculated by adding all corresponding columns in the edge detection filter and storing the result in memory #j. This is repeated until the (2N+1)th row is calculated. Once j=2N+1, the memory contents are added or subtracted as necessary depending on the sign of the filter coefficients and the results are summed from memories #1 through #2N+1. The result of this calculation is outputted as the filter output. Next, the memories are shifted as illustrated and described with reference to FIG. 11. Returning to FIG. 9b, the edge detection filter is then moved downwards on the image by one row. A check is then performed to make sure that the edge detection filter is not out of the image row range of the image. If it is, the filter is moved over by one column and the process is begun once again at the new column and at row 1. In addition, a check is performed to make sure that the edge detection filter is not out of image columns. If this is the case, processing ends. If, the edge detection filter is not out of image rows, the newest row 2N+1 is calculated and the results stored in memory #2N+1. Once again the memory contents of memories #1 through 2N+1 are added or subtracted depending on the sign of the filter coefficients to obtain the filter output result. Electronic circuits shown in FIG. 15 efficiently calculate this horizontal edge filter. Image pixel data are read out from image memory and fed to memory #2M+1 and shifted to memory #2M, . . . #1. All pixel data forming the image in the same row are summed at the summer 1501 and the summer's 1501 output is fed to memory #2N+1 and shifted to #N+2, . . . #1. The contents of memory #2N+1 to #N+2 are added while the contents of memory #N to #1 are subtracted at the summer in order to calculate the filter output. While illustrated with reference to advancing an edge detection filter vertically from the top to the bottom of an image by single units, then advancing from left to right one unit at a time and repeating the process, the present invention is not so limited. Rather the present invention is drawn broadly to moving in two orthogonal directions, preferably top to bottom, and left to right.

This can be extended to a more general form of the edge filter of coefficients as shown in FIGS. 6a-b. "a" can be an integer or floating-point of positive or negative value. A similar efficient filter operation is described in the following section.

For the horizontal edge direction, after calculating the rows as if all the coefficients are 1, the row results are multiplied by the coefficient of a. Multiplying each row result is more efficient than multiplying each pixel data.

$$R_X = -a\sum_{j=1}^{j=N} R_{X,j} + a\sum_{j=N+2}^{j=2N+1} R_{X,j} \qquad (16)$$

$$R_{X,1} = \sum_{i=1}^{i=2M+1} z_{i,1} \qquad (17)$$

$$R_{X,2} = \sum_{i=1}^{i=2M+1} z_{i,2} \qquad (18)$$

$$\ldots$$
$$\ldots$$

$$R_{X,2N+1} = \sum_{i=1}^{i=2M+1} z_{i,2N+1} \qquad (19)$$

$$R_X = -a\sum_{j=1}^{j=N} R_{X,j} + a\sum_{j=N+2}^{j=2N+1} R_{X,j} \qquad (20)$$

Once the filter was calculated for the first position, the content of the memories are shifted by one and only the newest row is calculated as the filter moves one row down.

$$R_{X,1} \leftarrow R_{X,2} \qquad (21)$$

$$R_{X,2} \leftarrow R_{X,3} \qquad (22)$$

$$\ldots$$
$$\ldots$$

$$R_{X,2N} \leftarrow R_{X,2N+1} \qquad (23)$$

Only the newest row is calculated as follows $$R_{X,2N+1} = \sum_{i=1}^{i=2M+1} z_{i,2N+1} \qquad (24)$$

Then sum these terms as follows:

$$R_X = -a\sum_{j=1}^{j=N} R_{X,j} + a\sum_{j=N+2}^{j=2N+1} R_{X,j} \qquad (25)$$

where a can be 1, −1 or another value.

Figure 10A:
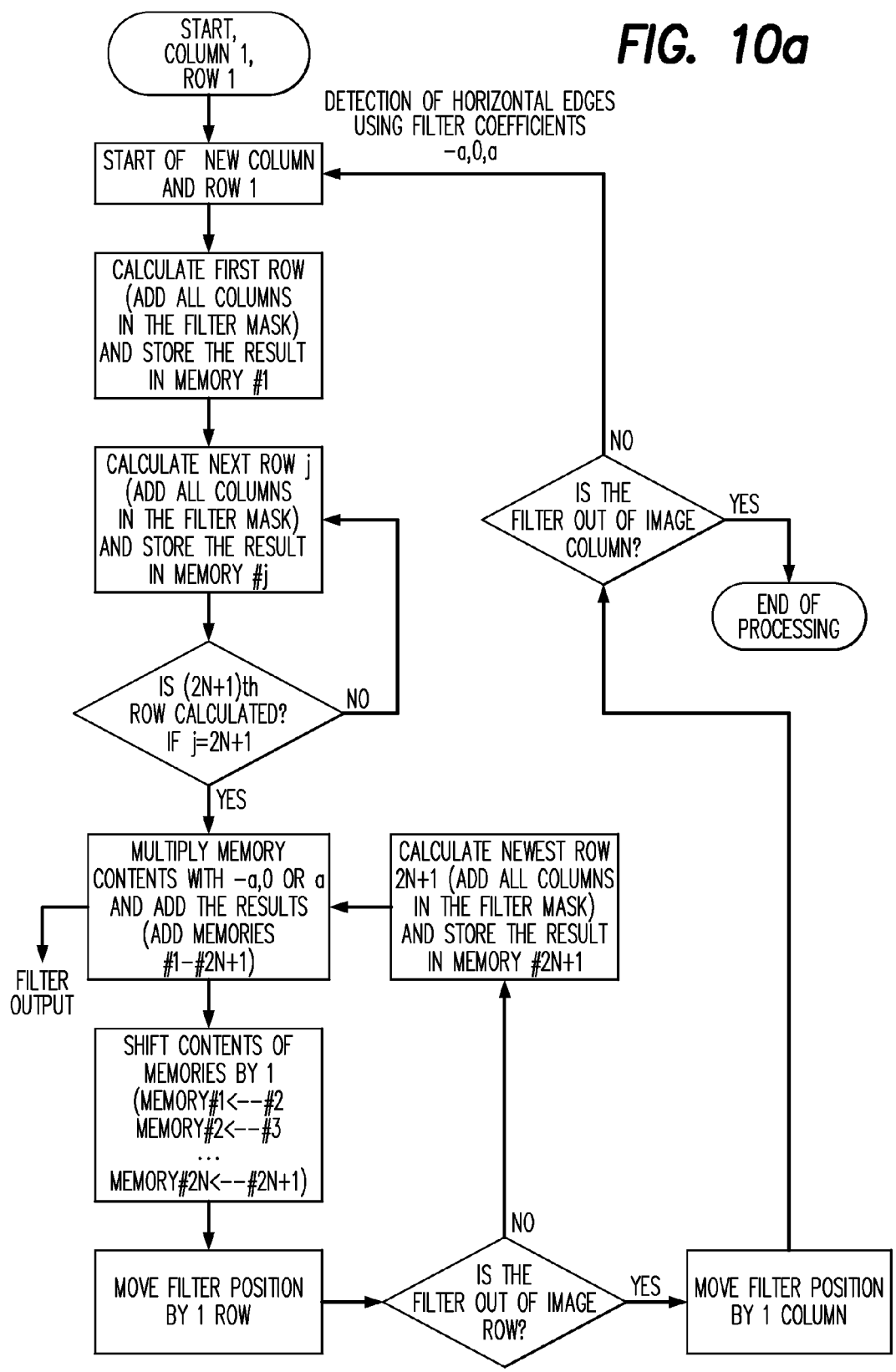
Figure 10B:
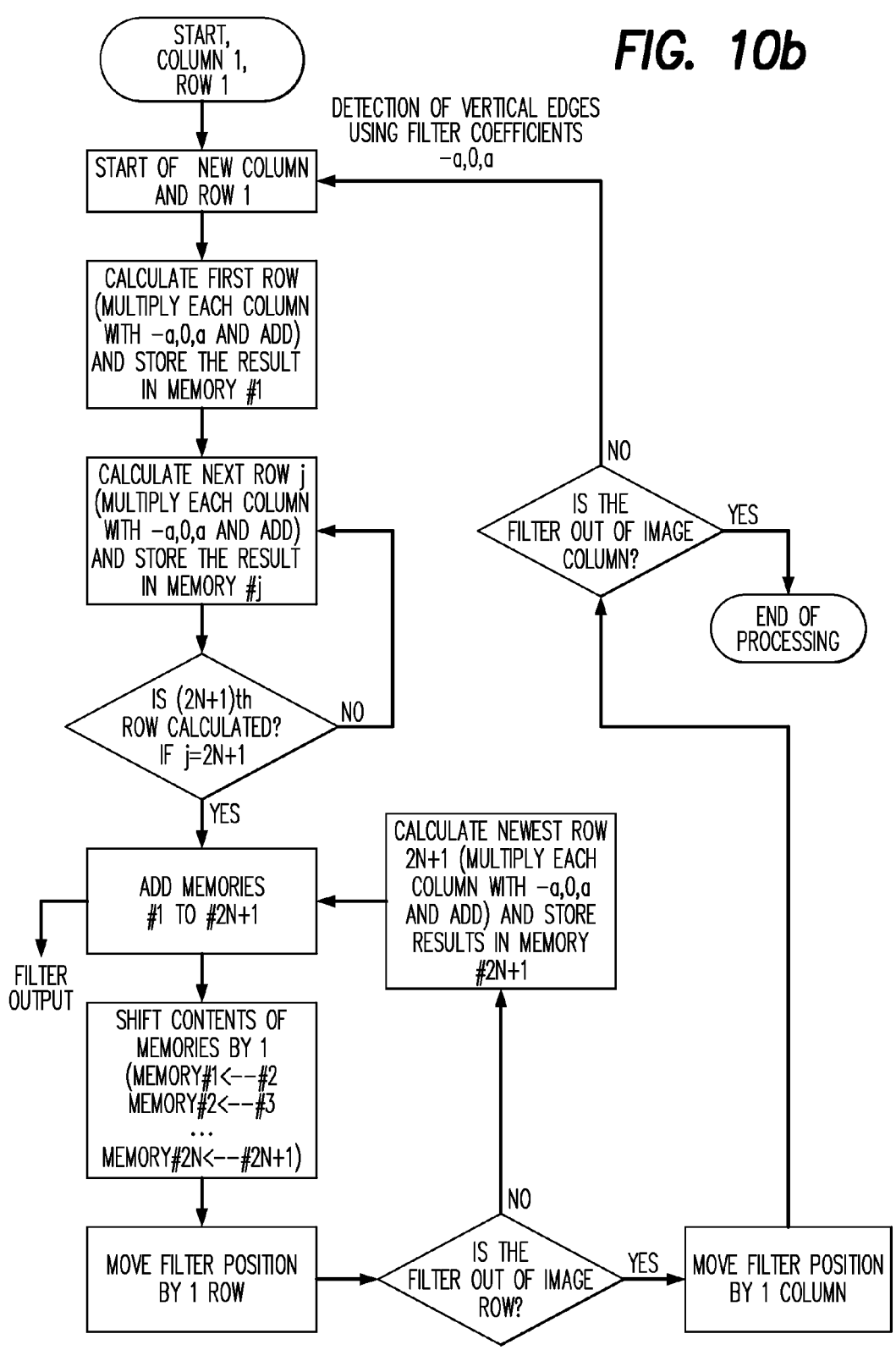

This efficient calculation is illustrated by the flowchart shown in FIG. 10a.

The similar iteration technique can be used to calculate R efficiently for a more general filter using $a_j$ $$R_X = -\sum_{j=1}^{j=N} a_j R_j + \sum_{j=N+2}^{j=2N+1} a_{2N+2-j} R_j \quad (26)$$

This can be efficiently calculated as follows $$R_{X,1} = \sum_{i=1}^{i=2M+1} z_{i,1} \quad (27)$$

$$R_{X,2} = \sum_{i=1}^{i=2M+1} z_{i,2} \quad (28)$$

...
...

$$R_{X,2N+1} = \sum_{i=1}^{i=2M+1} z_{i,2N+1} \quad (29)$$

$$R_X = -\sum_{j=1}^{j=N} a_j R_{X,j} + \sum_{j=N+2}^{j=2N+1} a_{2N+2-j} R_{X,j} \quad (30)$$

Once the filter in the first position was calculated, we can only shift the content of memories by one and calculate the newest row as the filter moves one row down.

$$R_{X,1} \leftarrow R_{X,2} \quad (31)$$

$$R_{X,2} \leftarrow R_{X,3} \quad (32)$$

...
...

$$R_{X,2N} \leftarrow R_{X,2N+1} \quad (33)$$

Only the newest row is calculated as follows $$R_{X,2N+1} = \sum_{i=1}^{i=2M+1} z_{i,2N+1} \quad (34)$$

Then sum these terms.

$$R_X = -\sum_{j=1}^{j=N} a_j R_{X,j} + \sum_{j=N+2}^{j=2N+1} a_{2N+2-j} R_{X,j} \quad (35)$$

The filter moves down and the calculation continues until the filter position goes out of the image row or the image boundary. The filter position then moves to the first row of the next column position and continues the same operation.

For vertical edges, the filter in FIG. 5h can be expressed by $$R_Y = \sum_{j=1}^{j=2N+1} \left( -\sum_{i=1}^{i=M} z_{i,j} + \sum_{i=M+2}^{i=2M+1} z_{i,j} \right) \quad (36)$$

This calculation can be efficiently executed by an iteration technique as described before.

$$R_{Y,1} = -\sum_{i=1}^{i=M} z_{i,1} + \sum_{i=M+2}^{i=2M+1} z_{i,1} \quad (37)$$

$$R_{Y,2} = -\sum_{i=1}^{i=M} z_{i,2} + \sum_{i=M+2}^{i=2M+1} z_{i,2} \quad (38)$$

...
...

$$R_{Y,2N+1} = -\sum_{i=1}^{i=M} z_{i,2N+1} + \sum_{i=M+2}^{i=2M+1} z_{i,2N+1} \quad (39)$$

$$R_Y = \sum_{j=1}^{j=2N+1} R_{Y,j} \quad (40)$$

Once the filter in the first position is calculated, the filter in the next position can be calculated by only shifting the contents of memories and calculating only the newest row as follows, $$R_{Y,1} \leftarrow R_{Y,2} \quad (41)$$

$$R_{Y,2} \leftarrow R_{Y,3} \quad (42)$$

...
...

$$R_{Y,2N} \leftarrow R_{Y,2N+1} \quad (43)$$

and only the newest row is calculated as follows, $$R_{Y,2N+1} = -\sum_{i=1}^{i=M} z_{i,2N+1} + \sum_{i=M+2}^{i=2M+1} z_{i,2N+1} \quad (44)$$

Figure 13:
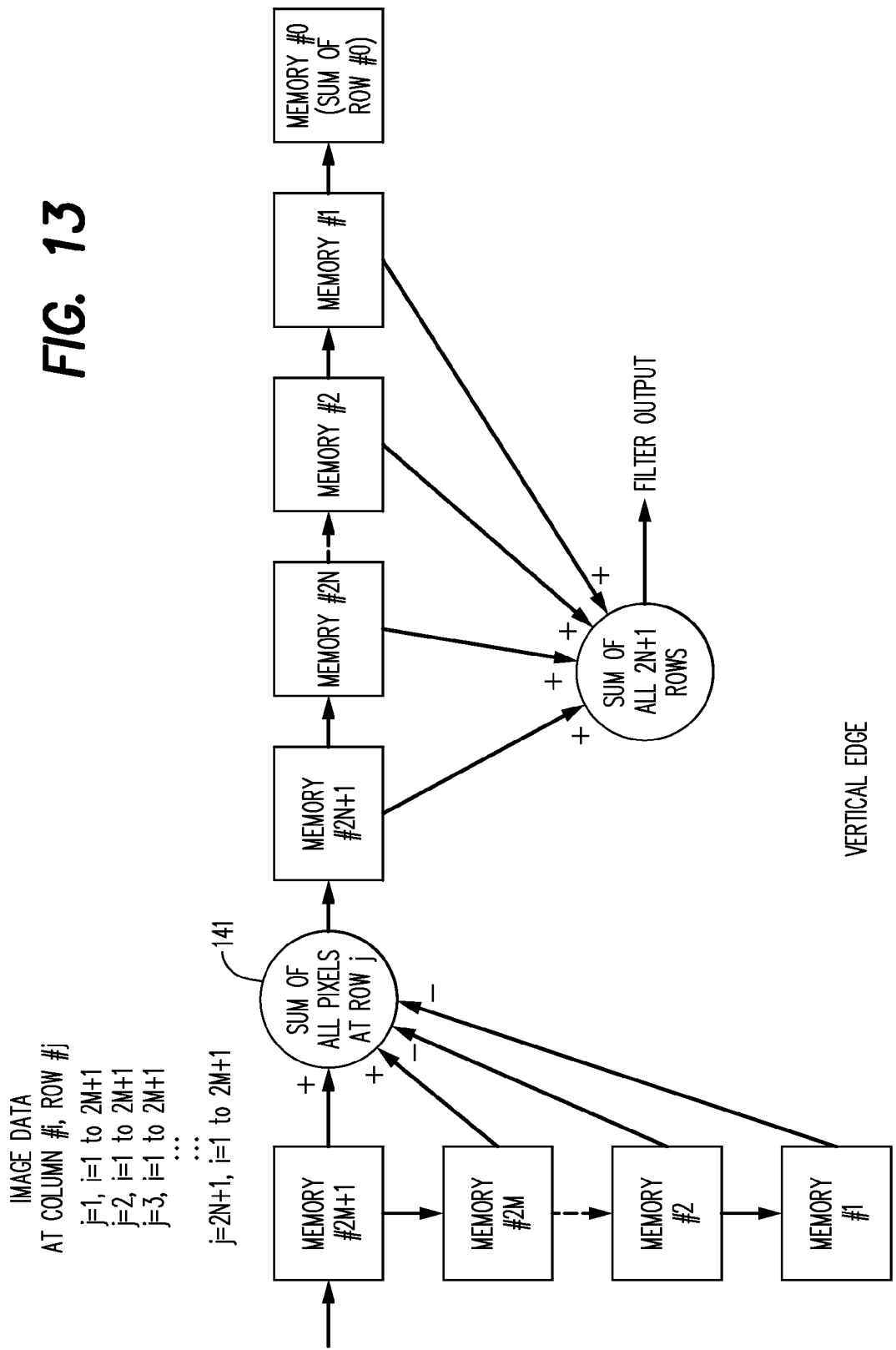

This operation is depicted in FIG. 11. Furthermore, the flowchart in FIG. 9a describes the iteration method at many positions in the whole image area. The method illustrated in FIG. 9a is quite similar to that illustrated above with reference to FIG. 9b. The primary difference arises from slightly different calculations regarding the arrangement of the vertical edge filter coefficients −1, 0, 1. It should be emphasized at this point that the present invention is directed to the use of horizontal and vertical edge filters of any size having an arrangement of coefficients such as is illustrated with reference to FIGS. 5g and 5h. It would be evident to one skilled in the art to expand the application of any horizontal or vertical edge filter configured as are those defined by the present invention using the same methodology outlined herein. Returning to FIG. 9a, the vertical edge filter is applied at column 1, row 1 to the image. There is then calculated the first row through summation by adding or subtracting image pixel values, depending on the filter coefficient values, i.e., −1, 0 or 1, and further storing the result of the summation in memory #1. Next, there is calculated row j through summation by adding or subtracting image pixel values, depending on the filter coefficient values, i.e., −1, 0 or 1, and further storing the results in memory j. There is then, as before with reference to FIG. 9b, performed a check to see if the (2N+1)th row has been calculated. If not, the next row j is calculated and continues to be calculated in an interactive fashion until the $(2N+1)^{th}$ row is calculated. When j=2N+1, all of the memories are summed from memory #1 to memory #2N+1. The resulting summation results in the filter output. The memories are then shifted as described above with reference to the horizontal edge filter. The filter is moved by one row, a check is performed to see if the filter is out of the image row, and if not, the newest row 2N+1 is calculated through summation by adding or subtracting image pixel values, depending on the filter coefficient values, i.e., −1, 0 or 1, and storing the results in memory #2N+1. FIG. 13 illustrates electronic circuits to efficiently calculate this vertical edge filter. All pixels (image) data in the same row are read out from image memory and fed to memory #2M+1 and shifted to memory #2M, . . . , and #1. The pixel data in the same row are summed or subtracted at the summer. All pixels data of the next row are read out and summed at the summer in the same fashion. This operation continues until the last row of the filter for one filter position. The output (result) of the summer is fed to memory #2N+1 and shifted to memory #2N, . . . and #1. The contents of the memory #2N+1 to 1 are summed to calculate the filter output.

The filter is moved down by one row position and the filter calculation continues until the filter goes out of the image row or boundary.

The filter is not limited to −1, 0, 1 coefficients and can take a general form using a, or aj as $$R_Y = \sum_{j=1}^{j=2N+1} \left( -a \sum_{i=1}^{i=M} z_{i,j} + a \sum_{i=M+2}^{i=2M+1} z_{i,j} \right) \quad (45)$$

a can be also 1 or −1 or other values. This can be efficiently calculated using the iteration technique as described before. The first row to 2N+1 row in the filter mask are calculated as follows, $$R_{Y,1} = -a \sum_{i=1}^{i=M} z_{i,1} + a \sum_{i=M+2}^{i=2M+1} z_{i,1} \quad (46)$$

$$R_{Y,2} = -a \sum_{i=1}^{i=M} z_{i,2} + a \sum_{i=M+2}^{i=2M+1} z_{i,2} \quad (47)$$

...
...

$$R_{Y,2N+1} = -a \sum_{i=1}^{i=M} z_{i,2N+1} + a \sum_{i=M+2}^{i=2M+1} z_{i,2N+1} \quad (48)$$

$$R_Y = \sum_{j=1}^{j=2N+1} R_{Y,j} \quad (49)$$

As the filter is moved down by one row and the iteration operation can be used as follows.

$$R_{Y,1} \leftarrow R_{Y,2} \quad (50)$$

$$R_{Y,2} \leftarrow R_{Y,3} \quad (51)$$

...
...

$$R_{Y,2N} \leftarrow R_{Y,2N+1} \quad (52)$$

and only the newest row is calculated as follows, $$R_{Y,2N+1} = -a \sum_{i=1}^{i=M} z_{i,2N+1} + a \sum_{i=M+2}^{i=2M+1} z_{i,2N+1} \quad (53)$$

Using $a_i$ $$R_Y = \sum_{j=1}^{j=2N+1} \left( -\sum_{i=1}^{i=M} a_i z_{i,j} + \sum_{i=M+2}^{i=2M+1} a_{2M+2-i} z_{i,j} \right) \quad (54)$$

$$R_{Y,1} = -\sum_{i=1}^{i=M} a_i z_{i,1} + \sum_{i=M+2}^{i=2M+1} a_{2M+2-i} z_{i,1} \quad (55)$$

$$R_{Y,2} = -\sum_{i=1}^{i=M} a_i z_{i,2} + \sum_{i=M+2}^{i=2M+1} a_{2M+2-i} z_{i,2} \quad (56)$$

...
...

$$R_{Y,2N+1} = -\sum_{i=1}^{i=M} a_i z_{i,2N+1} + \sum_{i=M+2}^{i=2M+1} a_{2,M+2-i} z_{i,2N+1} \quad (57)$$

$$R_Y = \sum_{j=1}^{j=2N+1} R_{Y,j} \quad (58)$$

As the filter is moved down by one row and the iteration operation can be used as follows.

$$R_{Y,1} \leftarrow R_{Y,2} \quad (59)$$

$$R_{Y,2} \leftarrow R_{Y,3} \quad (60)$$

...

$$R_{Y,2N} \leftarrow R_{Y,2N+1} \quad (61)$$

and only the newest row is calculated as follows, $$R_{Y,2N+1} = -\sum_{i=1}^{i=M} a_i z_{i,2N+1} + \sum_{i=M+2}^{i=2M+1} a_{2M+2-i} z_{i,2N+1} \quad (62)$$

Other forms of iteration can be also used to speed up the filter calculation in the whole image area. For example, for the vertical edges, after calculating the filter result in the first position, the next row position can be calculated by adding the new row to the result of the first position and subtracting the last row in the first position.

The vertical edge filter is calculated as follows, $$R_Y = \sum_{j=1}^{j=2N+1} \left( -\sum_{i=1}^{i=M} z_{i,j} + \sum_{i=M+2}^{i=2M+1} z_{i,j} \right) \quad (63)$$

This result $R_Y$ is stored in memory. The calculation result of each row expressed below is also stored in memory #1 to #2N+1.

$$R_{Y,1} = -\sum_{i=1}^{i=M} z_{i,1} + \sum_{i=M+2}^{i=2M+1} z_{i,1} \qquad (64)$$

$$R_{Y,2} = -\sum_{i=1}^{i=M} z_{i,2} + \sum_{i=M+2}^{i=2M+1} z_{i,2} \qquad (65)$$

...
...

$$R_{Y,2N+1} = -\sum_{i=1}^{i=M} z_{i,2N+1} + \sum_{i=M+2}^{i=2M+1} z_{i,2N+1} \qquad (66)$$

Next, the filter moves down by one row and the filter of the new position can be calculated as described below. First, the contents of the memories are shifted as follow, $$R_{Y,0} \leftarrow R_{Y,1} \qquad (67)$$

$$R_{Y,1} \leftarrow R_{Y,2} \qquad (68)$$

$$R_{Y,2} \leftarrow R_{Y,3} \qquad (69)$$

...
...

$$R_{Y,2N} \leftarrow R_{Y,2N+1} \qquad (70)$$

$$R_Y \leftarrow (R_Y - R_{Y,0} + R_{Y,2N+1}) \qquad (71)$$

where ← sign indicates storing the right hand term into the left hand term, also $R_{Y,0}$ indicates the first row result of the previous position. $R_{Y,2N+1}$ in the last operation indicates the newest calculation result for the newest row. This calculation of the newest row $R_{Y,2N+1}$ is actually carried out. However, the summing operation requires only one addition and one subtraction of the row results rather than 2N+1 additions of the previous iteration method. The $R_Y$ value from the previous position and stored in the memory is used and updated by the summing operation and stored in the memory again. This iteration technique can be extended to filter coefficients of a or $a_j$ just like before. This operation of adding the newest row and subtracting the oldest row is best illustrated in FIG. 11.

Figure 14:
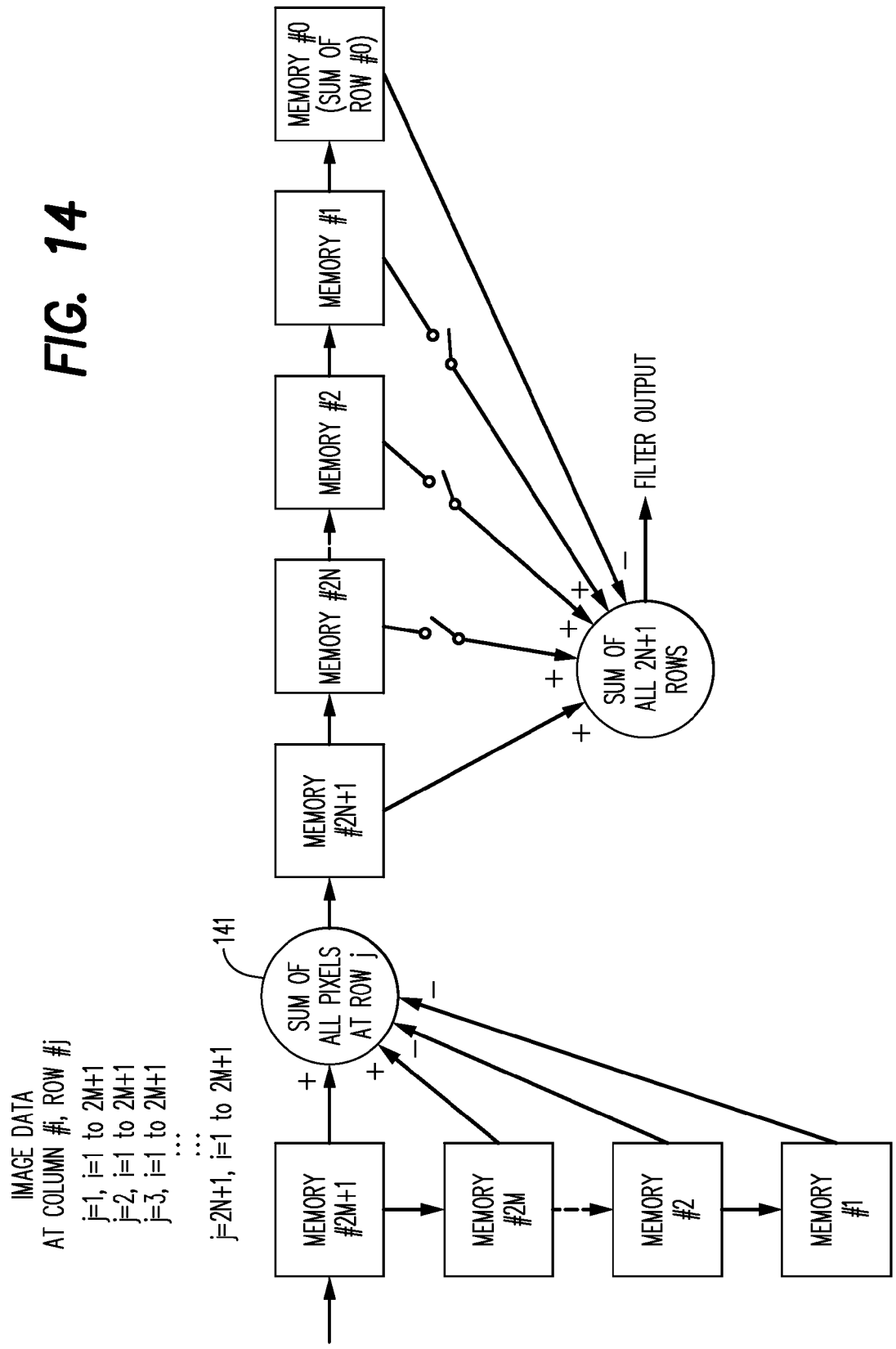

FIG. 14 illustrates electronic circuits comprising memory locations, accumulators, summers, and the like, to efficiently calculate this vertical edge filter. While diagrammed with reference to such physical circuit components, it is recognized that the operations of the present invention can be performed in whole, or in part, by a digital signal processor (DSP). All pixels (image) data in the same row are read out from image memory and fed to memory #2M+1 and shifted to memory #2M, . . . and #1. The pixel data in the same row are summed or subtracted at the summer 141. All pixels data of the next row are read out and summed at the summer in the same fashion. This operation continues until the last row of the filter for one filter position. The output (result) of the summer is fed to memory #2N+1 and shifted to memory #2N, . . . and #0. For the first filter position, the contents of the memory #2N+1 to 1 are summed to calculate the filter output as switches of memory #1 to 2N+1 are all closed but switch of memory #0 is open. For the next filter position, switches of memory #0 and #2N+1 are closed while switches of memory #1 to #2N are open to calculate the new filter output by adding the newest row data (memory #2N+1) and subtracting the oldest row (memory #0) from the previous filter result (output) or the summer's content.

Similarly, the horizontal edge filter can be efficiently calculated as follows.

$$R_X = -\sum_{\substack{i=1,\\j=1}}^{\substack{i=2M+1\\j=N}} z_{i,j} + \sum_{\substack{i=1\\j=N+2}}^{\substack{i=2M+1\\j=2N+1}} z_{i,j} \qquad (72)$$

$$R_{X,1} = \sum_{i=1}^{i=2M+1} z_{i,1} \qquad (73)$$

$$R_{X,2} = -\sum_{i=1}^{i=2M+1} z_{i,2} \qquad (74)$$

...
...

$$R_{X,2N+1} = \sum_{i=1}^{i=2M+1} 1 z_{i,2N+1} \qquad (75)$$

$$R_X = -\sum_{j=1}^{j=N} R_{X,j} + \sum_{j=N+2}^{j=2N+1} R_{X,j} \qquad (76)$$

The filter output of the first position is stored in memory. Also, the calculation result of rows is stored in memories #1 to #2N+1. Then the filter is moved down by one row and the filter output in the new position is efficiently calculated as follows. First the contents of memories #1 to #2N+1 are shifted as follows, $$R_{X,0} \leftarrow R_{X,1} \qquad (77)$$

$$R_{X,1} \leftarrow R_{X,2} \qquad (78)$$

$$R_{X,2} \leftarrow R_{X,3} \qquad (79)$$

...
...

$$R_{X,2N} \leftarrow R_{X,2N+1} \qquad (80)$$

$$R_X \leftarrow (R_X + R_{X,0} - R_{X,N} - R_{X,N+1} + R_{X,2N+1}) \qquad (81)$$

Figure 16:
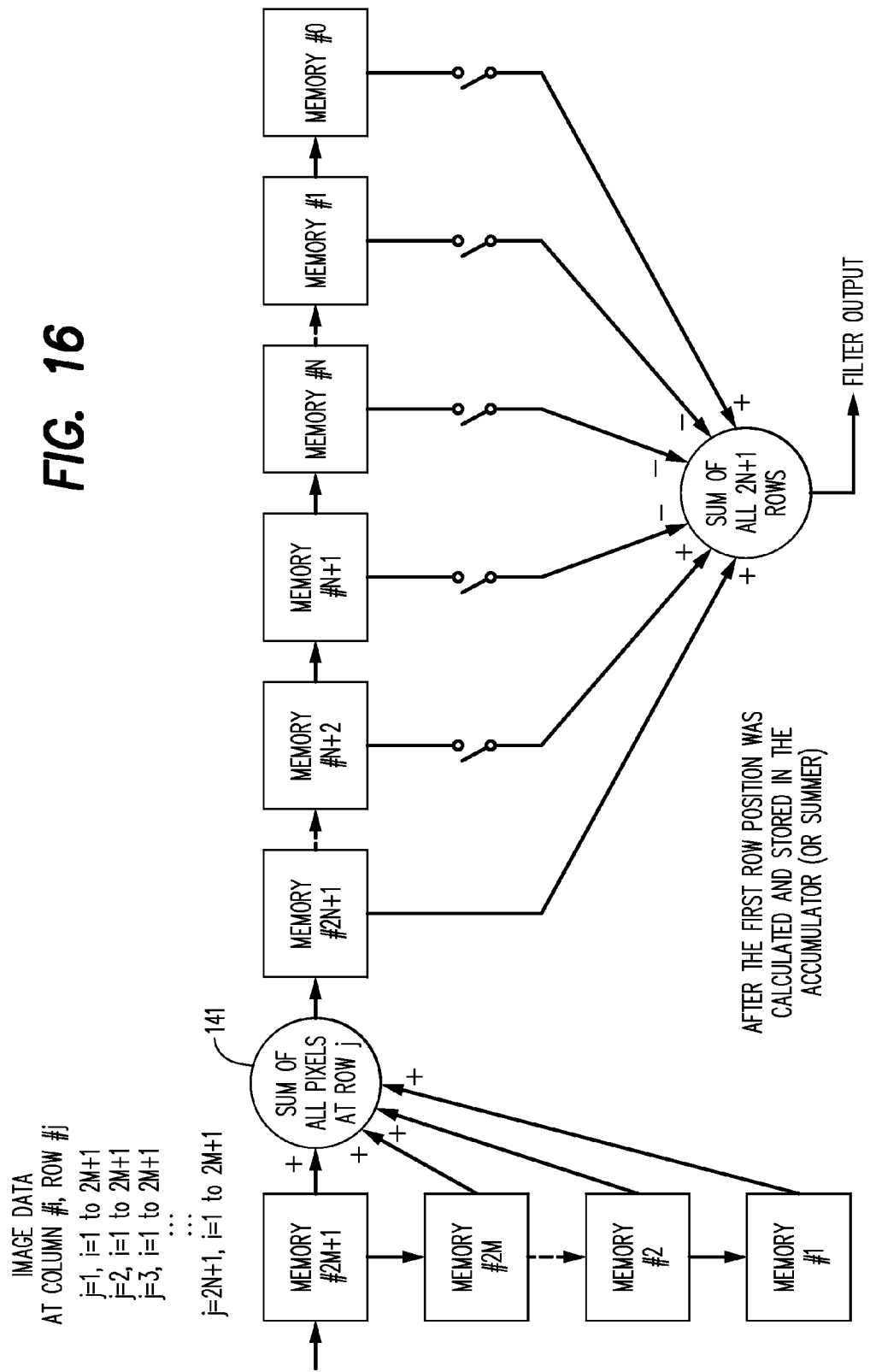

Only $R_{X,2N+1}$ at the new position is actually calculated and stored in memory #2N+1 while all other terms in the right side are in the memories. $R_X$ value from the previous position and stored in the memory is used and updated by the summing operation and stored in the memory again. Electronic circuits shown in FIG. 16 efficiently calculate this horizontal edge filter. Image pixel data are read out from image memory and fed to memory #2M+1 and shifted to memory #2M, . . . #1. All pixels data in the same row are summed at the summer and the summer's output is fed to memory #2N+1 and shifted to #N+2, . . . and #0. For the first filter position, the contents of memory #2N+1 to #N+2 are added while the contents of memory #N to #1 are subtracted at the summer in order to calculate the filter output. Switches at memories function to achieve this operation. All switches except memory #N+1 and #0 are closed for the first filter position. Once the filter output is calculated, the new pixel data in the next row enter memory #2M+1 to #1 and summed at the summer and this output or the newest summed row data from the next filter position enters memory #2N+1. Meantime, the contents of memory #2N+1 to 0 are all shifted right by one memory. The filter result (output) or the content of the summer from the previous filter position is then updated for the new position by adding the content of memory #2N+1 and #0 and subtracting the contents of memory #N+1 and #N. Switches function to achieve this operation. Switches at memory #2N+1, #N+1, #N and #0 are closed while all other switches are open.

This iteration method saves the number of additions. These operations of vertical and horizontal edges can be expanded to have coefficients of a, −a, 0, or $a_j$ as before. With these coefficients, the iteration method saves the number of multiplications as well as additions and thus the filter's speed is increased.

The most general form of the edge detection filter is as follows, $$R = \sum_{\substack{i=1 \\ j=1}}^{\substack{i=2M+1 \\ j=2N+1}} a_{i,j} z_{ij} \tag{82}$$

However, the filter can be of symmetrical form as follows
For the horizontal edge filter, $$a_{i,2N+2-j} = -a_{i,j} \tag{83}$$

and $$a_{i,N+1} = 0 \tag{84}$$

where i=1 to 2M+1 and j=1 to N
and $$a_{2M+2-i,j} = a_{i,j} \tag{85}$$

where i=1 to M and j=1 to 2N+1.
This horizontal edge filter is illustrated in FIG. 7a as an example of 9×9 filter.

Furthermore, $a_{i,j}$ is split into x and y components for the horizontal edge filter as follows $$a_{i,j} = b_i \cdot c_j \tag{86}$$

$$b_{2M+2-i} = b_i \tag{87}$$

where i=1 to M
Also $$-c_{2N+2-j} = c_j \tag{88}$$

where j=1 to N
Finally the horizontal edge filter can be expressed as follows, $$R_X = -\sum_{\substack{i=1 \\ j=1}}^{\substack{i=2M+1 \\ j=N}} b_i c_j z_{ij} + \sum_{\substack{i=1 \\ j=N+2}}^{\substack{i=2M+1 \\ j=2N+1}} b_i c_{2N+2-j} z_{ij} \tag{89}$$

This filter can use the iteration technique for a faster calculation.

For the vertical edge filter, filter coefficients $a_{i,j}$ also have symmetry except the sign (plus or minus).

$$a_{2M+2-i,j} = -a_{i,j} \tag{90}$$

and $$a_{M+1,j} = 0 \tag{91}$$

where i=1 to M and j=1 to 2N+1

Also $$a_{i,2N+2-j} = a_{i,j} \tag{92}$$

where i=1 to 2M+1 and j=1 to N.
This vertical edge filter is illustrated in FIG. 7b as an example of 9×9 filter.

Furthermore, $a_{i,j}$ is split into x and y components for the vertical edge filter as follows $$a_{i,j} = b_i \cdot c_i \tag{93}$$

$$-b_{2M+2-i} = b_i \tag{94}$$

where i=1 to M $$c_{2N+2-j} = c_j \tag{95}$$

where j=1 to N
Finally the vertical direction filter can be expressed as follows, $$R_Y = \sum_{j=1}^{j=2N+1} c_j \left( -\sum_{i=1}^{i=M} b_i z_{ij} + \sum_{i=M+2}^{i=2M+1} b_{2M+2-i} z_{ij} \right) \tag{96}$$

Furthermore, this filter can use the iteration technique for a faster calculation.

In case of the filter with a square mask or M=N, the edge filters of 2 directions need to be equally weighted in the directions and thus $$|b_i| = |c_i| \tag{97}$$

except the center row for the horizontal edge filter and the center column for the vertical edge filter.
Also the same symmetrical properties, which were previously discussed, apply to these coefficients.
Therefore, the edge filters can be expressed as follows.

$$R_X = -\sum_{\substack{i=1 \\ j=1}}^{\substack{i=2M+1 \\ j=M}} b_i b_j z_{ij} + \sum_{\substack{i=1 \\ j=M+2}}^{\substack{i=2M+1 \\ j=2M+1}} b_i b_{2M+2-j} z_{ij} \tag{98}$$

Figure 17:
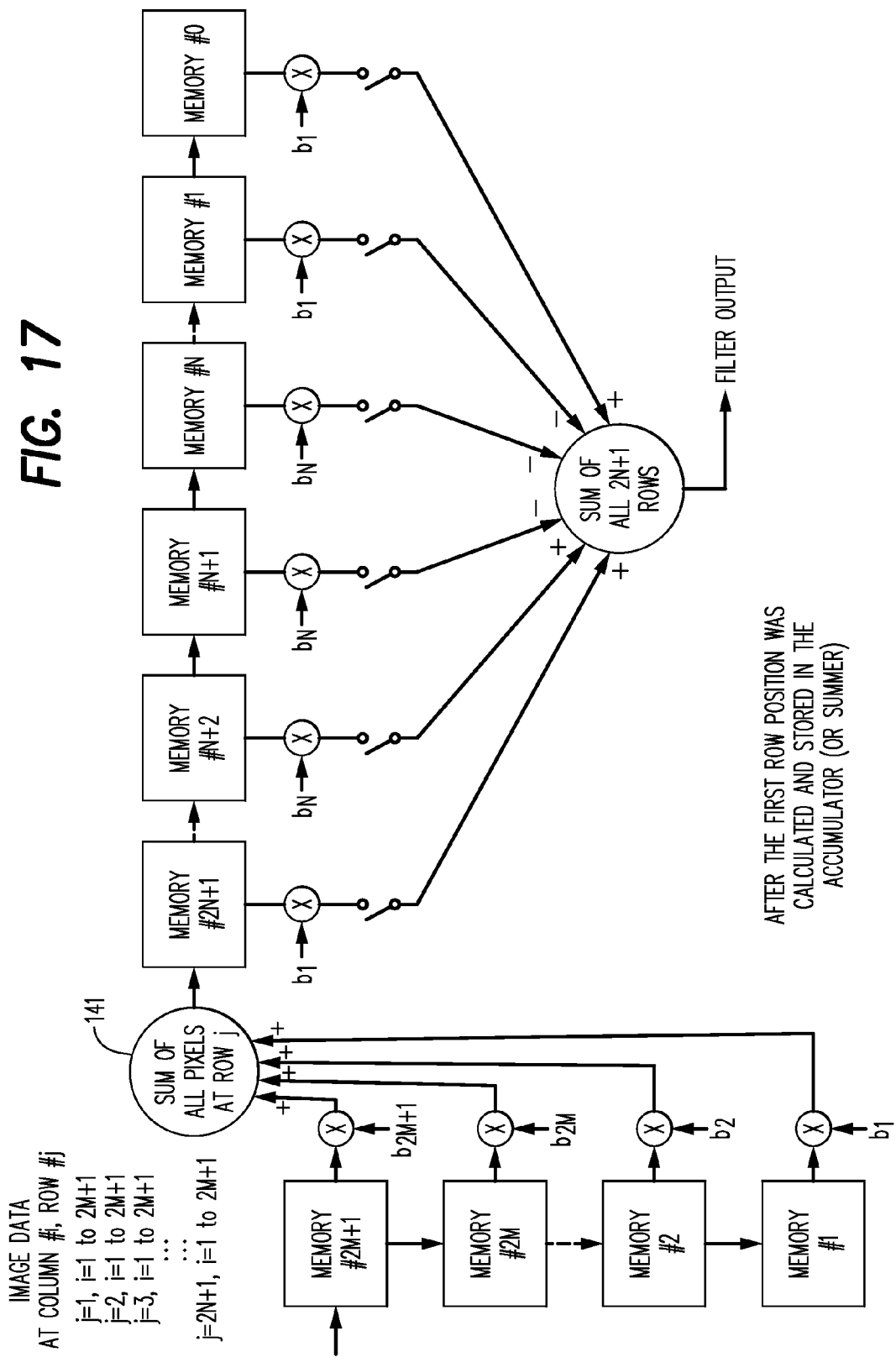

This horizontal edge filter is illustrated in FIG. 8a as an example of an 9×9 filter. This horizontal edge filter can be efficiently calculated using the electronic circuit shown in FIG. 17. Image data are read out from image memory and fed to memory #2M+1 and shifted to memory #2M, . . . #1. The contents of these memories are multiplied by coefficients b1, . . . , b2M+1 and summed at the summer. The output of summer is fed to memory #2N+1 and shifted to memory#2N, . . . #0. For the first filter position, the contents of memory #2N+1 to #1 excluding #N+1 are multiplied by coefficients and summed at the summer to calculate the filter output. For the next filter position, new image data for the newest row are read out from the image memory and fed to memory #2M+1 and shifted and the contents of memory #2M+1 to 1 are multiplied by coefficients and summed at the summer and the summer's output is fed to memory #2N+1. Meantime, the contents of memory #2N+1 to #0 are shifted right by one memory. The filter output or the content of the summer is updated by adding the value of memory#2N+1 multiplied by coefficient b1, subtracting the values of memory #N+1 and #N multiplied by $b_N$ and adding the value of memory #0 multiplied coefficient b1 to the filter output of the previous position (or the summer's content). It's noted that M=N.

$$R_Y = \sum_{j=1}^{j=2M+1} b_j \left( -\sum_{i=1}^{i=M} b_i z_{ij} + \sum_{i=M+2}^{i=2M+1} b_{2M+2-i} z_{ij} \right) \quad (99)$$

Figure 18:
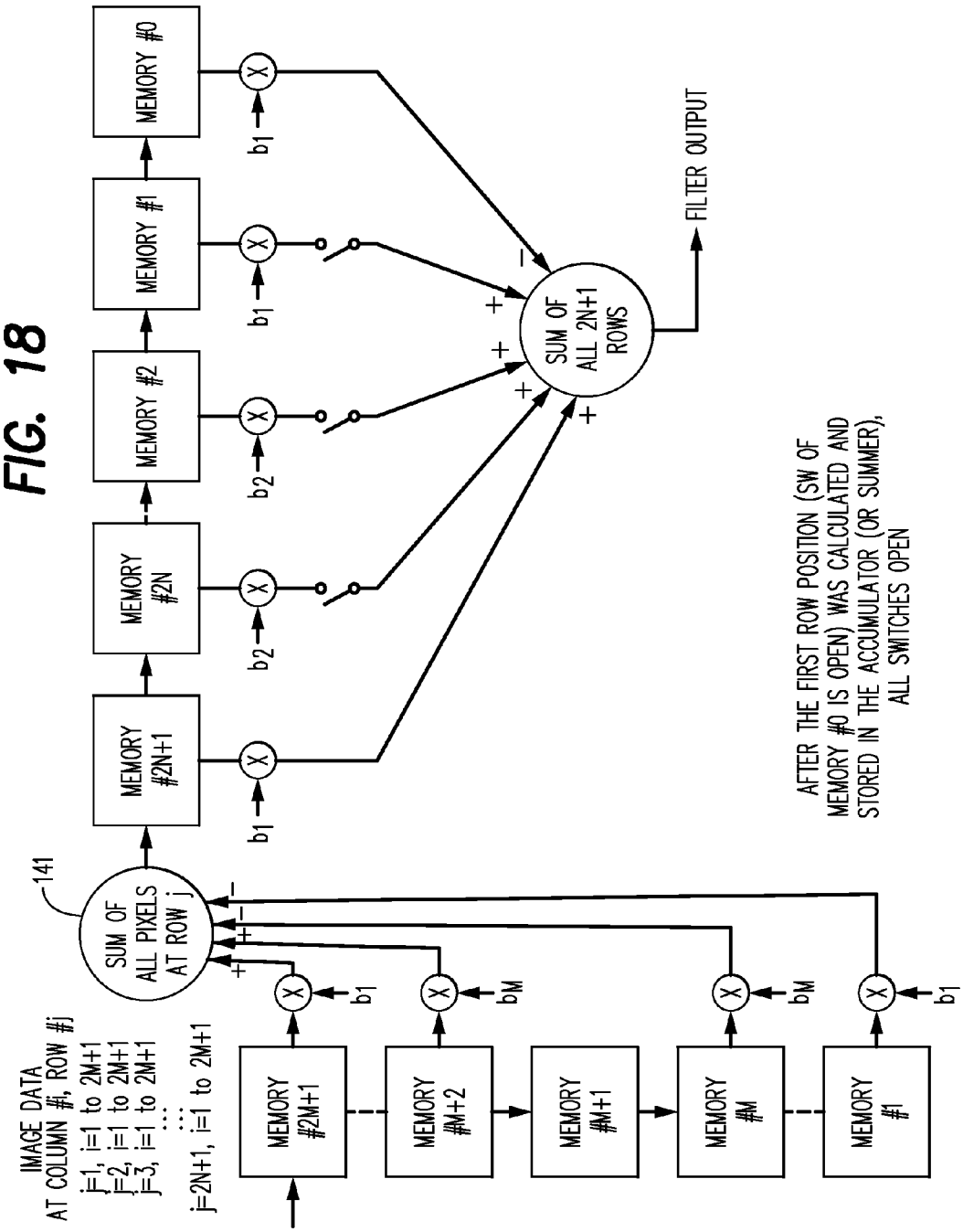

This vertical edge filter is illustrated in FIG. 8b as an example of a 9×9 filter. Electronic circuit shown in FIG. 18 can efficiently calculate this vertical edge filter. Image data are read out from image memory and fed to memory#2M+1 and shifted to #2M to #1. These column pixel data in the same row are multiplied by coefficients and summed (i.e., added or subtracted) at the summer as shown in FIG. 18. The summer's output is fed to memory #2N+1 and shifted right by one memory as more summation data in a row are fed to memory #2N+1. For the first filter position, the contents of memory #2N+1 to 1 are multiplied and summed at the summer to calculate the filter output. For the next position, the result of the first filter position is used to efficiently calculate the next result. As the new summed data of the newest row for the new filter position is fed to memory#2N+1, all memory contents are shifted right and the new filter output is calculated by adding memory #2N+1 content multiplied by coefficient b1 and subtracting memory #0 multiplied by b1 from the previous filter result or the content of the summer.

In another embodiment, the filters can move upward starting from the bottom row. In another embodiment, the filter can move laterally, for example, to the right, starting from the far left column. In another embodiment, the filter can move laterally to the left, starting from the far right column.

One or more embodiments of the present invention have been described. Nevertheless, it will be understood that various modifications may be made without departing from the spirit and scope of the invention. Accordingly, other embodiments are within the scope of the following claims.

What is claimed is:

1. An apparatus for detecting edges in an ultrasound image, comprising:
   a ultrasound image comprising B number of rows and C number of columns of a plurality of image pixels, each pixel associated with a respective pixel value;
   an edge detection filter comprising:
   an odd number (2N+1) of rows and an odd number of columns, comprising at least three rows and at least five columns or at least five rows and at least three columns;
   a first set of zero coefficients extending along a direction traversing said filter through a center position to form a first side and a second side;
   a second set of coefficients equal to 1 extending away from said direction on said first side; and
   a third set of coefficients equal to −1 extending away from said direction on said second side;
   means for positioning said edge detection filter at an origin of a first direction and an origin of a second direction within said plurality of image pixels;
   means for applying said coefficients of said edge detection filter to pixel values of correspondingly-positioned ones of said plurality of image pixels to calculate a plurality of row values associated with each of a plurality of rows of said real-time ultrasound image;
   means for storing each of said plurality of row values in a respective one of a plurality of linearly-shiftable memory locations 2N+1 to 1;
   means for summing the plurality of row values in each of said plurality of said memory locations 2N+1 to 1 to produce a filter output and for storing said filter output in a memory storage device;
   means for incrementing said position of said edge detection filter in the first direction, wherein the incremented position is associated with a next row of said plurality of image pixels;
   means for shifting the row values of said plurality of memory locations to shift the row value stored in memory location X to memory location X−1, for each X from 2N+1 through 1;
   means for applying said coefficients of said edge detection filter to pixel values of correspondingly-positioned ones of said plurality of image pixels of said next row to calculate a next row value;
   means for storing the next row value in memory location 2N+1;
   means for calculating a new filter output by adding the row value stored in memory location 2N+1 to the filter output stored in the memory storage device and subtracting the value stored in memory location 0;
   means for storing said new filter output in said memory storage device; and
   means for incrementing said position of said edge detection filter in the second direction and resetting said position to said first direction origin of said image.

2. An apparatus for detecting edges in an ultrasound image, comprising:
   a ultrasound image comprising B number of rows and C number of columns of a plurality of image pixels, each pixel associated with a respective pixel value;
   an edge detection filter comprising:
   an odd number of rows and 2M+1 columns, said odd number of rows and 2M+1 columns comprising at least three rows and at least five columns or at least five rows and at least three columns;
   a first set of zero coefficients extending along a direction traversing said filter through a center position to form a first side and a second side;
   a second set of coefficients equal to 1 extending away from said direction on said first side; and
   a third set of coefficients equal to −1 extending away from said direction on said second side;
   means for positioning said edge detection filter at an origin of a first direction and an origin of a second direction within said plurality of image pixels;
   means for applying said coefficients of said edge detection filter to values of correspondingly-positioned ones of said plurality of image pixels to calculate a plurality of column values associated with each of a plurality of columns of said real-time ultrasound image;
   means for storing each of said plurality of column values in a respective one of a plurality of linearly-shiftable memory locations 2M+1 to 1;
   means for summing the plurality of column values in each of said plurality of said memory locations 2M+1 to 1 to produce a filter output and for storing said filter output in a memory storage device;
   means for incrementing said position of said edge detection filter in a first direction, wherein the incremented position is associated with a next column of said plurality of image pixels;
   means for shifting the column values of said plurality of memory locations to shift the column value stored in memory location X to memory location X−1, for each X from 2M+1 to 1;
   means for applying said coefficients of said edge detection filter to pixel values of correspondingly-positioned ones of said plurality of image pixels of said next row to calculate a next column value;

means for storing the next column value in memory location 2M+1;

means for calculating a new filter output by adding the row value stored in memory location 2N+1 to the filter output stored in the memory storage device and subtracting the value stored in memory location 0;

means for storing said new filter output in said memory storage device; and means for incrementing said position of said edge detection filter in the second direction and resetting said position to said first direction origin of said image.

3. A method for applying an edge detection filter to an image comprising the steps of:
   a. providing an image comprised of rows and columns of pixels, each pixel associated with a respective pixel value;
   b. providing an edge detection filter comprising:
   2N+1 rows and 2M+1 columns, wherein N and M are integers, said 2N+1 rows and 2M+1 columns comprising at least three rows and at least five columns or at least five rows and at least three columns;
   a first set of zero coefficients extending along a direction traversing said filter through a center position to form a first side and a second side;
   a second set of coefficients equal to 1 extending away from said direction on said first side; and
   a third set of coefficients equal to −1 extending away from said direction on said second side;
   c. positioning said edge detection filter at an origin of a first direction and an origin of a second direction within said image;
   d. summing the negative of pixel values of image pixels corresponding to each of columns 2M+1 to M+2 in a row of the edge detection filter and adding the pixel values of image pixels corresponding to each of columns M to 1 in said row of the edge detection filter to calculate a row value for said row;
   e. repeating step d to calculate row values for rows 1 to 2N+1 and storing the row value for each of the 2N+1 to 1 rows in a respective one of memory locations 2N+1 to 1;
   f. summing the plurality of values in each of memory locations 2N+1 to 1 to produce a filter output and storing said filter output in a memory storage device;
   g. incrementing said position of said edge detection filter in the first direction, wherein the incremented position is associated with pixels of a next row of said image;
   h. shifting the contents of said plurality of memory locations 2N+1 to 1 to respective ones of memory locations 2N to 0;
   i. summing the negative of the pixel values of image pixels corresponding to each of columns 2M+1 to M+2 in said next row and adding the pixel values of image pixels corresponding to each of columns M to 1 in said next row to produce a next row value;
   j. storing the next row value in memory location 2N+1;
   k. calculating a new filter output by adding the row value stored in memory location 2N+1 to the filter output stored in the memory storage device and subtracting the value stored in memory location 0;
   l. storing said new filter output in said memory storage device;
   m. repeating steps g through l until a boundary of said image is reached;
   n. incrementing said position of said edge detection filter in the second direction and resetting said position to said first direction origin of said image; and
   o. repeating steps d through n until a boundary of said image is reached.

4. A method, for execution by a processor, for applying an edge detection filter to an image comprising the steps of:
   a. providing an image comprised of rows and columns of pixels, each pixel associated with a respective pixel value;
   b. providing an edge detection filter comprising:
   2N+1 rows and 2M+1 columns, wherein N and M are integers, said 2N+1 rows and 2M+1 columns comprising at least three rows and at least five columns or at least five rows and at least three columns;
   a first set of zero coefficients extending along a direction traversing said filter through a center position to form a first side and a second side;
   a second set of coefficients equal to 1 extending away from said direction on said first side; and
   a third set of coefficients equal to −1 extending away from said direction on said second side;
   c. positioning said edge detection filter at an origin of a first direction and an origin of a second direction within said image;
   d. summing the pixel values of image pixels corresponding to each of rows 2N+1 to N+2 in column 1 of the edge detection filter and adding the negative of the pixel values of image pixels corresponding to each of rows N to 1 in column 1 of the edge detection filter to calculate a column value for column 1 of the edge detection filter;
   e. repeating step d to calculate column values for columns 2 to 2M+1 and storing the column value for each of columns 2M+1 to 2 in a respective one of linearly-shiftable memory locations 2M+1 through 1;
   f. summing the plurality of values in each of memory locations 2M+1 through 1 to produce a filter output and storing said filter output in a memory storage device;
   g. incrementing said position of said edge detection filter in the first direction, wherein the incremented position is associated with pixels of a next column of said image;
   h. shifting the column value stored in memory location X to memory location X-1, for each X from 2M+1 through 1;
   i. summing the pixel values of image pixels corresponding to each of rows 2N+1 to N+2 in said next column and adding the negative of pixel values of image pixels corresponding to each of rows N to 1 in said next column to produce a next column value;
   j. storing the next column value in memory location 2M+1;
   k. calculating a new filter output by adding the column value stored in memory location 2M+1 to and subtracting the value stored in memory location 0 from the filter output stored in the memory storage device;
   l. storing said new filter output in said memory storage device;
   m. repeating steps g through l until a boundary of said image is reached;
   n. incrementing said position of said edge detection filter in the second direction and resetting said position to said first direction origin of said image; and
   o. repeating steps d through n until a boundary of said image is reached.

5. A method for applying an edge detection filter to an image comprising the steps of:
   a. providing an image comprised of rows and columns of pixels, each pixel associated with a respective pixel value;
   b. providing an edge detection filter comprising:
   2N+1 rows and 2M+1 columns, wherein N and M are integers, said 2N+1 rows and 2M+1 columns comprising at least three rows and at least five columns or at least five rows and at least three columns;

a first set of zero coefficients extending along a direction traversing said filter through a center position to form a first side and a second side;

a second set of coefficients equal to 1 extending away from said direction on said first side; and a third set of coefficients equal to −1 extending away from said direction on said second side;

c. positioning said edge detection filter at an origin of a first direction and an origin of a second direction within said image;

d. summing the negative of the pixel values of image pixels corresponding to each of rows $2N+1$ to $N+2$ in a column of the edge detection filter and adding the pixel values of image pixels corresponding to each of rows N to 1 in said column of the edge detection filter to calculate a column value for said column;

e. repeating step d to calculate column values for columns 1 to $2M+1$ and storing the column value for each of the $2M+1$ to 1 columns in a respective one of memory locations $2M+1$ to 1;

f. summing the plurality of values in each of memory locations $2M+1$ to 1 to produce a filter output and storing said filter output in a memory storage device;

g. incrementing said position of said edge detection filter in the first direction, wherein the incremented position is associated with pixels of a next column of said image;

h. shifting the contents of said plurality of memory locations $2M+1$ to 1 to respective ones of memory locations $2M$ to 0;

i. summing the negative of the pixel values of image pixels corresponding to each of rows $2N+1$ to $N+2$ in said next column and adding the pixel values of the image pixels corresponding to each of rows N to 1 in said next column to produce a next column value;

j. storing the next column value in memory location $2M+1$;

k. calculating a new filter output by adding the column value stored in memory location $2M+1$ to the filter output stored in the memory storage device and subtracting the value stored in memory location 0;

l. storing said new filter output in said memory storage device;

m. repeating steps g through l until a boundary of said image is reached;

n. incrementing said position of said edge detection filter in the second direction and resetting said position to said first direction origin of said image; and o. repeating steps d through n until a boundary of said image is reached.

* * * * *